(12) United States Patent
Xiao et al.

(10) Patent No.: US 12,574,956 B2
(45) Date of Patent: Mar. 10, 2026

(54) SPATIAL PARAMETER DETERMINATION METHOD AND DEVICE

(71) Applicant: ZTE Corporation, Shenzhen (CN)

(72) Inventors: Huahua Xiao, Shenzhen (CN);
Shujuan Zhang, Shenzhen (CN);
Zhaohua Lu, Shenzhen (CN);
Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 637 days.

(21) Appl. No.: 17/917,439

(22) PCT Filed: Mar. 22, 2021

(86) PCT No.: PCT/CN2021/082153
§ 371 (c)(1),
(2) Date: Oct. 6, 2022

(87) PCT Pub. No.: WO2021/208673
PCT Pub. Date: Oct. 21, 2021

(65) Prior Publication Data
US 2023/0156772 A1 May 18, 2023

(30) Foreign Application Priority Data
Apr. 15, 2020 (CN) .......................... 202010297300.6

(51) Int. Cl.
*H04W 72/56* (2023.01)
*H04B 7/06* (2006.01)
*H04L 5/00* (2006.01)

(52) U.S. Cl.
CPC ........ *H04W 72/56* (2023.01); *H04B 7/06952* (2023.05); *H04L 5/0035* (2013.01); *H04L 5/0053* (2013.01)

(58) Field of Classification Search
CPC .. H04W 72/56; H04B 7/06952; H04L 5/0035; H04L 5/0053
See application file for complete search history.

(56) References Cited

U.S. PATENT DOCUMENTS

2020/0228190 A1* 7/2020 Cirik .................... H04B 7/0695
2020/0229185 A1 7/2020 Zhang et al.
2024/0365324 A1 10/2024 Zhang et al.

FOREIGN PATENT DOCUMENTS

CN 103493127 A 1/2014
CN 108093480 A 5/2018
(Continued)

OTHER PUBLICATIONS

Chinese Search Report; Application No. 2020102973006; Filing Date: Apr. 15, 2020; date of mailing: Jul. 10, 2025; 6 pages.
(Continued)

*Primary Examiner* — Michael Thier
*Assistant Examiner* — Nevena Zecevic Sandhu
(74) *Attorney, Agent, or Firm* — CANTOR COLBURN LLP

(57) ABSTRACT

Embodiments of the present disclosure provide a spatial parameter determination method and device. The spatial parameter determination method includes: determining priority information of N types of transmission signals according to first configuration information, wherein N is an integer greater than 1; and determining spatial parameter information corresponding to a same symbol according to the priority information, wherein the spatial parameter information is used for transmitting at least one type of transmission signals in the N types of transmission signals.

11 Claims, 3 Drawing Sheets

---

Determine priority information of N types of transmission signals according to first configuration information, N being an integer greater than 1 ⟍ S102

Determine spatial parameter information corresponding to a same symbol according to the priority information, the spatial parameter information being used for transmitting at least one type of transmission signals in the N types of transmission signals ⟍ S104

(56)                References Cited

FOREIGN PATENT DOCUMENTS

| | | | |
|---|---|---|---|
| CN | 108199819 | A | 6/2018 |
| CN | 110351058 | A | 10/2019 |
| CN | 110535571 | A | 12/2019 |
| CN | 110740510 | A | 1/2020 |
| CN | 110831173 | A | 2/2020 |
| CN | 110859008 | A | 3/2020 |
| CN | 111867109 | A | 10/2020 |
| WO | 2017121496 | A1 | 7/2017 |
| WO | 2019062992 | A1 | 4/2019 |
| WO | 2019192385 | A1 | 10/2019 |
| WO | 2019192410 | A1 | 10/2019 |

OTHER PUBLICATIONS

Huawei, HiSilicon, "R1-141598, Discussion on network assistance signaling parameters," 3GPP TSG RAN WG1 Meeting #76 bis, Apr. 4, 2019, 6 pages.
LG Electronics "R1-1904208, Enhancements on multi-TRP/panel transmission," 3GPP TSG RAN WG1 Meeting #96 bis, Apr. 12, 2019, 14 pages.
International Search Report for corresponding application PCT/CN2021/082153 filed Mar. 22, 2021; Mail date Jun. 22, 2021.
Chinese Office Action for corresponding application 2020102973006; Issued on Jan. 26, 2025.
Ericsson, On Spatial Relation Switching Delay Requirements, 3GPP TSG RAN WG4 Meeting #94-e-bis, Electronic Meeting, Apr. 20-30, 2020, R4-2004424.
Huawei, HiSilicon, Maintenance of SRS for NR positioning, 3GPP TSG RAN WGI Meeting #100bis-e, E-Meeting, Apr. 20-Apr. 30, 2020, R1-2001559.
Huawei, HiSilicon, Running 38. 321 CR for NR_L1enh_URLLC, 3GPP TSG RAN WGI Meeting #109 electronic Feb. 24-Mar. 6, 2020, R2-2001358.
Huawei, Maintenance of SRS for NR positioning, 3GPP TSG RAN WG1 Meeting #100-e, Feb. 24-Mar. 6, 2020, R1-2000191.
Huawei, Signaling between NG-RAN and 5GC to support NR positioning, 3GPP TSG RAN WGIMeeting #99, Nov. 18-22, 2019, R1-1911900.
Intel, Feature lead Summary on simultaneous Tx/Rx, 3GPP TSG RAN WG1 #96, Athens Greece, Feb. 25-Mar. 1, 2019, R101903323.
Japanese Office Action for corresponding Japanese Patent Application No. 2022-560395; Dated Nov. 5, 2024.
LG Electronics, Remaining issues of UCI enhancements for NR URLLC, 3GPP TSG RAN WG1 #100, e-meeting, Feb. 24-Mar. 6, 2020, R1-2000671.
Nokia, Offline discussion summary on QCL, 3GPP TSG RAN WG1#92bis, Sanya People Republic of China, Apr. 16-20, 2018, R1-1805690.
Qualcomm Inc, Multi-TSP Enhancements, 3GPP TSG-RAN WG1 Meeting #99, Nov. 18-22, 2019, Reno Nevada, R1-1912967.
Qualcomm Inc, Virtual Cell ID for SRS, 3GPP TSG RAN WG1 #96, Athens Greece, Feb. 25-Mar. 1, 2019, R1-1902381.
Vivo, UL inter-UE Tx prioritization for URLLC, 3GPP TSG RAN WG1 #100, e-meeting Feb. 24-Mar. 6, 2020, R1-2000329.
European Search Report for corresponding EP21879281; Report dated Aug. 30, 2023.
Huawei, HiSilicon, Simultaneous RX to TX over CC/BWP (s), 3GPP RAN WGI Meeting #95, Spokane, USA Nov. 12-16, 2018, R1-1812241.
Singapore Office Action for corresponding application 11202254041J; Mail date Oct. 16, 2025.

* cited by examiner

Fig. 1

First communication node 10

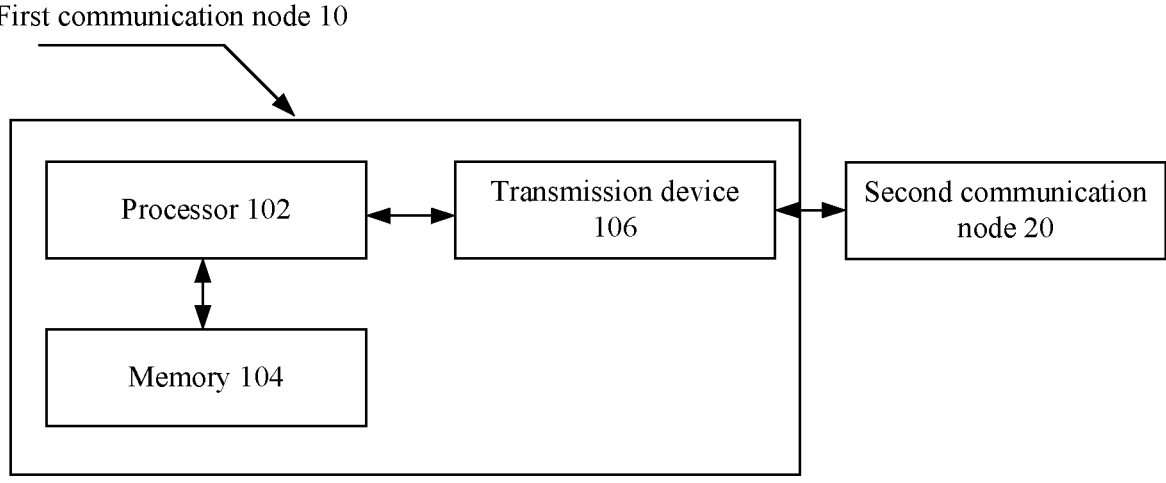

Fig. 2

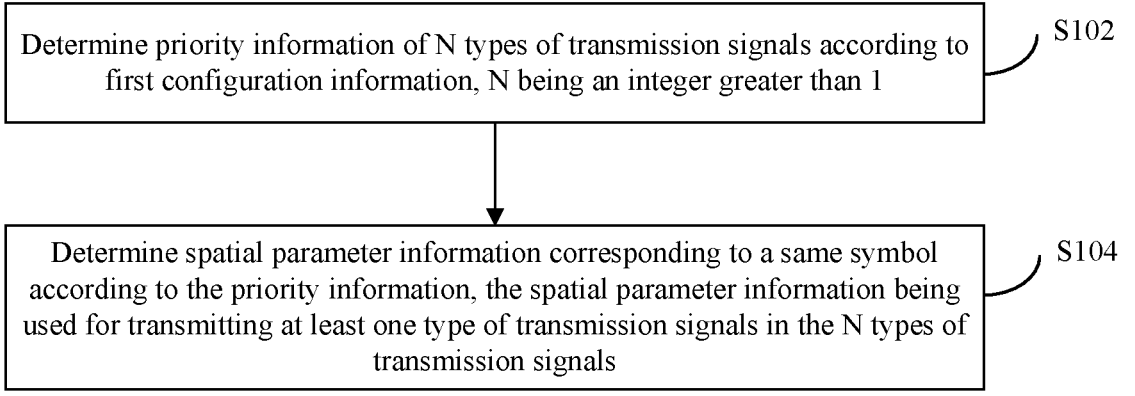

Fig. 3

Determine a spatial parameter of a second transmission signal according to one of: a first transmission signal, one or more preset TCI code points, a CORESET, wherein a time interval between a physical downlink control channel scheduling the second transmission signal and the second transmission signal is less than a first preset threshold    S202

Fig. 4

SPATIAL PARAMETER DETERMINATION METHOD AND DEVICE

CROSS REFERENCE

This application is a National Stage Filing of the PCT International Application No. PCT/CN2021/082153 filed on Mar. 22, 2021, which claims priority to Chinese Application No. 202010297300.6 filed on Apr. 15, 2020, the entirety of which is herein incorporated by reference.

TECHNICAL FIELD

Embodiments of the present disclosure relate to the field of communications, and in particular, to a spatial parameter determination method and device.

BACKGROUND

Joint transmission or reception of Multiple Transmission and Reception Point (Multi-TRP) is currently an important technology in wireless communications, and has a significant effect in increasing the throughput of wireless communications. Therefore, Multi-TRP transmission is introduced in standards such as Long Term Evolution (LTE), Long Term Evolution-Advanced (LTE-A), and New Radio Access Technology (NR). Meanwhile, Multi-Panel transmission is also introduced in the NR standard, and multiple antenna panels are installed on a receiving end and/or a sending end, so as to improve the frequency spectrum efficiency of a wireless communication system.

In a related protocol, especially in a high frequency transmission process, a User Equipment (UE) needs to determine a spatial parameter for receiving a signal, so as to determine a corresponding receiving or transmission beam. In the related art, due to factors such as engineering implementation or technologies and costs, generally, for a same port, only one spatial parameter and a corresponding beam can be used within a symbol to transmit a transmission signal. However, in the transmission of the related art, when spatial parameters of different transmission signals are different, a spatial parameter corresponding to a symbol cannot be effectively determined.

For the problem in the related art of how to effectively determine a spatial parameter corresponding to the same symbol, no effective solution has been proposed in the related art.

SUMMARY

The embodiments of the present disclosure provide a spatial parameter determination method and device, which can at least solve the problem in the related art of how to effectively determine a spatial parameter corresponding to the same symbol.

According to an embodiment of the present disclosure, a spatial parameter determination method is provided, including:

determining priority information of N types of transmission signals according to first configuration information, wherein N is an integer greater than 1; and determining spatial parameter information corresponding to a same symbol according to the priority information, wherein the spatial parameter information is used for transmitting at least one type of transmission signals in the N types of transmission signals.

According to another embodiment of the present disclosure, a spatial parameter determination method is provided, including:

determining a spatial parameter of a second transmission signal according to one of:

a first transmission signal, one or more preset Transmission Configuration Indicator (TCI) code points, or a Control Resource Set (CORESET);

wherein a time interval between a physical downlink control channel scheduling the second transmission signal and the second transmission signal is less than a first preset threshold.

According to another embodiment of the present disclosure, a spatial parameter determination device is provided, including:

a first determination module, configured to determine priority information of N types of transmission signals according to first configuration information, wherein N is an integer greater than 1; and a second determination module, configured to determine spatial parameter information corresponding to a same symbol according to the priority information, wherein the spatial parameter information is used for transmitting at least one type of transmission signals in the N types of transmission signals.

According to another embodiment of the present disclosure, a spatial parameter determination device is provided, including:

a third determination module, configured to determine a spatial parameter of a second transmission signal according to one of:

a first transmission signal, one or more preset Transmission Configuration Indicator (TCI) code points, or a Control Resource Set (CORESET);

wherein a time interval between a physical downlink control channel scheduling the second transmission signal and the second transmission signal is less than a first preset threshold.

According to another embodiment of the present disclosure, a computer-readable storage medium is provided. The computer-readable storage medium stores a computer program, wherein the computer program is configured to execute the operations in any one of the method embodiments when running.

According to another embodiment of the present disclosure, an electronic device is provided, including a memory and a processor, wherein the memory stores a computer program, and the processor is configured to run the computer program so as to execute the operations in any one of the method embodiments.

BRIEF DESCRIPTION OF THE DRAWINGS

FIG. 1 is a block diagram illustrating the hardware structure for implementing a spatial parameter determination method according to an embodiment of the present disclosure;

FIG. 2 is a flowchart (1) of a spatial parameter determination method according to an embodiment of the present disclosure;

FIG. 3 is a flowchart (2) of a spatial parameter determination method according to an embodiment of the present disclosure;

FIG. 4 is a flowchart (1) for determining a spatial parameter under a Single DCI mode and a Multi DCI mode according to an embodiment of the present disclosure;

DETAILED DESCRIPTION

Figure 5:
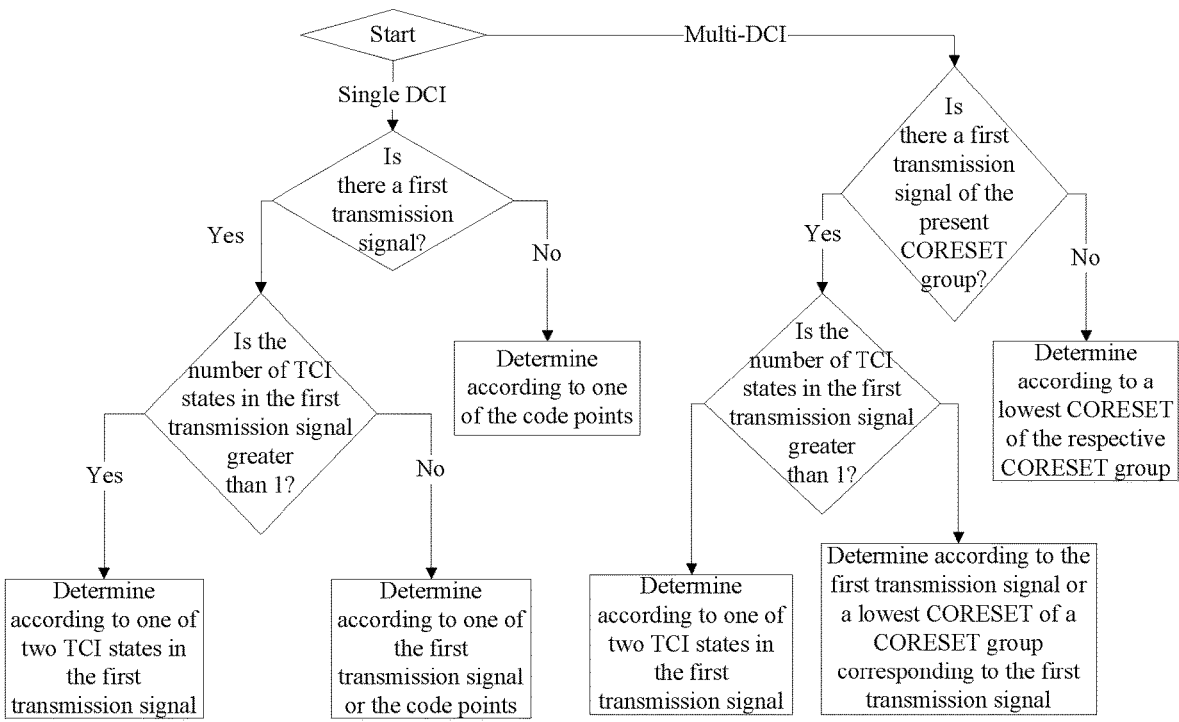
FIG. 5 is a flowchart (2) for determining a spatial parameter under a Single DCI mode and a Multi DCI mode according to an embodiment of the present disclosure.

The present disclosure will be described below with reference to the drawings and embodiments in detail.

It should be noted that, terms such as "first" and "second" in the description, claims, and the accompanying drawings of the present disclosure are used to distinguish similar objects, but are not necessarily used to describe a specific sequence or order.

To further describe the spatial parameter determination method and device in the embodiments of the present disclosure, an applicable scenario of the spatial parameter determination method and device in the embodiments of the present disclosure will be described as follows.

The spatial parameter determination method and device in the embodiments of the present disclosure may be applied to various communication systems, for example, a Long Term Evolution (LTE) system, an LTE Time Division Duplex (TDD), an LTE Advance, a Universal Mobile Telecommunication System (UMTS), a 5G New Radio (NR) communication, and systems corresponding to evolved or evolved versions thereof. The spatial parameter determination method and device in the embodiments of the present disclosure are used for interaction between at least one first communication node and at least one second communication node. The first communication node can be an Evolutional Node B (eNB or eNodeB) in LTE, a base station device in a 5G network, or a base station in a future communication system, etc. The base station may include various network side devices, such as a macro base station, a micro base station, a home base station, a wireless remote, a router, a location server, or a primary cell and a secondary cell, or may include a location management function (LMF) device. The second communication node may be a terminal device, or may also be an access terminal, a User Equipment (UE), a subscriber unit, a subscriber station, a mobile station, a remote station, a remote terminal, a mobile device, a user terminal, a wireless communication device, a user agent, or a user device. For example, a terminal device may be a cellular phone, a cordless phone, a Session Initiation Protocol (SIP) phone, a Wireless Local Loop (WLL) station, a Personal Digital Assistant (PDA), a handheld device having wireless communication capability, a computing device or other processing device connected to a wireless modem, an in-vehicle device, a wearable device, or a terminal device in a 5G network, etc. The above application scenarios are merely exemplary, and the present disclosure is not limited thereto. The first communication node and the second communication node may be collectively referred to as communication nodes.

The spatial parameter determination method provided in the embodiments of the present disclosure may be executed on the first communication node and/or the second communication node. Taking the execution on the first communications node as an example, FIG. 1 is a block diagram illustrating the hardware structure for implementing a spatial parameter determination method according to an embodiment of the present disclosure. As shown in FIG. 1, the first communications node 10, such as a base station, may include one or more (only one is shown in FIG. 1) processors 102 (the processors 102 may include but are not limited to processing devices such as a Micro Controller Unit (MCU) or a Field Programmable Gate Array (FPGA)) and a memory 104 configured to store data. The above-mentioned first communication node may further include a transmission device 106 configured to implement a communication function with the second communication node 20. A person having ordinary skill in the art can understand that the structure shown in FIG. 1 is merely exemplary, which does not limit the structure of the first communication node. For example, the first communication node 10 may also include more or fewer components than shown in FIG. 1, or have a different configuration than shown in FIG. 1.

In the embodiments of the present disclosure, in order to measure Channel State Information (CSI), or obtain parameters of some other functions of a channel, such as parameters of time-frequency offset, mobility management, location information, and beam management, some reference signal resources need to be configured. The reference signal resources include, but are not limited to, Channel State Information-Reference Signal (CSI-RS) resources, Synchronization Signals Block (SSB) resources, Physical Broadcast Channel (PBCH) resources, Synchronization Broadcast Block/Physical Broadcast Channel (SSB/PBCH) resources, Sounding reference signal (SRS) resources, and/or Positioning Reference Signals (PRS) resources. The CSI-RS resources mainly refer to Non Zero Power Channel State Information-Reference Signal (NZP-CSI-RS) resources. The interference measurement resources include, but are not limited to, Channel State Information-Interference Measurement (CSI-IM), NZP-CSI-RS for Interference Measurement, and/or Zero Power Channel State Information-Reference Signal (ZP-CSI-RS). In one interference measurement, M1 interference measurement resources included in the interference measurement resources may include at least one of NZP-CSI-RS, CSI-IM and ZP-CSI-RS. These reference signals, according to a configured time domain feature, are divided into periodic reference signals, semi-persistent reference signals and aperiodic reference signals. The periodic reference signals are transmitted once every other period, the semi-persistent reference signals are periodically transmitted within a time interval from activation to deactivation, and the aperiodic reference signals are only transmitted once after being triggered via signaling. For example, the periodic reference signals include at least one of periodic NZP CSI-RS, CSI-IM, ZP CSI-RS, SSB and SRS; the aperiodic reference signals include at least one of aperiodic NZP CSI-RS, aperiodic CSI-IM, aperiodic ZP CSI-RS, aperiodic SSB and aperiodic SRS; and semi-persistent reference signals include at least one of semi-persistent NZP CSI-RS, semi-persistent CSI-IM, semi-persistent ZP CSI-RS, semi-persistent SSB and semi-persistent SRS. In the embodiments of the present disclosure, the SSB is used to represent an SSB and/or a PBCH.

In order to transmit data or signaling, physical channels are divided into a Physical Downlink Control Channel (PDCCH), a Physical Uplink Control Channel (PUCCH), a Physical Downlink Shared Channel (PDSCH), and a Physical Uplink Shared Channel (PUSCH), where the PUSCH and the PDSCH are referred to as physical shared channels, the PDCCH and the PUCCH are referred to as physical control channels or control channels, the PDCCH and the PDSCH are physical downlink channels, and the PUSCH and the PUCCH are physical uplink channels.

The transmission signal in the embodiments of the present disclosure includes a reference signal and/or a physical channel, for example, at least one of various reference signals and various physical channels including, for example, NZP CSI-RS, ZP CSI-RS, SSB, SRS, PDSCH, PDCCH, PUSCH, PUCCH, CSI-IM, etc. The reference signal may be periodic, aperiodic, or semi-persistent.

Since transmission signals having the same spatial parameter can be received or transmitted by using beams corresponding to the same spatial parameter, the transmission signals having the same spatial parameter are classified into transmission signals of the same type. For example, multiple transmission signals are divided into N types of transmission signals, the same type of transmission signals have the same spatial parameter, and different types of transmission signals have different spatial parameters, where N is an integer greater than 1.

The spatial parameter in the embodiments of the present disclosure includes at least one of the following parameters: a quasi-co-located reference signal, a quasi-co-located reference signal associated with a spatial reception parameter, a spatial transmission filter, a spatial relation reference signal and a quasi-co-located parameter. The quasi co-located parameter includes at least one of: a Quasi-Co-Located (QCL), a Transmission Configuration Indicator (TCI), a Transmission Configuration Indicator state (TCI state), a TCI state group, a QCL Type D, a reception beam group, a transmission beam group, a reception beam, a transmission beam and a Spatial Reception Parameter (Spatial Rx Parameter). The beam information may include at least one of an angle Of Arrival (AOA), an Angle Of Departure (AOD), a Zenith angle Of Departure (ZOD), a Zenith angle Of Arrival (ZOA), a Discrete Fourier Transformation (DFT) vector, a codeword in a codebook, a transmission beam, a reception beam, a transmission beam group, a reception beam group, a transmission beam index, a reception beam index, a transmission beam group index, and a reception beam group index.

The QCL may include QCL type A, QCL type B, QCL type C, and QCL Type D. Two ports satisfying a quasi-co-located relation represents that large-scale information of one port can be derived based on large-scale information of the other port. The large-scale information includes, but is not limited to, a Doppler shift, a Doppler spread, an average delay, a delay spread, and/or a Spatial Rx parameter. A classification for different QCL Types is listed as follows as an example:

'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

In the embodiments of the present disclosure, the unit in the time-domain may include at least one of the following time units: a slot, a symbol, a slot group, a symbol group, X milliseconds, and Y microseconds. The symbol group includes at least one symbol (e.g., mini-slot), and the slot group includes at least one slot, where X and Y are positive real numbers. In the embodiments of the present disclosure, a symbol refers to a time unit in a subframe or a time slot, for example, a symbol may be an Orthogonal Frequency Division Multiplexing (OFDM) symbol, a Single-Carrier Frequency Division Multiple Access (SC-FDMA) symbol, or an Orthogonal Frequency Division Multiple Access (OFDMA) symbol. In the embodiments of the present disclosure, a symbol and a time domain symbol are interchangeable, and include but not limited to OFDM symbols, OFDMA symbols, SC-FDMA symbols, variations of these symbols, and symbols obtained by performing time domain/frequency domain filtering on these symbols.

In addition, in the embodiments of the present disclosure, an index and an indicator are interchangeable concepts.

In the embodiments of the present disclosure, higher layer signaling includes Radio Resource Control (RRC) signaling and/or Media Access Control-Control Element (MAC CE) signaling; and physical layer signaling includes Downlink Control Information (DCI) in a PDCCH, or signaling fed back in a PUCCH or a PUSCH.

In the embodiments of the present disclosure, in a scenario of Multi-TRP or Multi-Panel transmission, one panel may correspond to one port group (for example, an antenna port group and an antenna group), and the panel and the port group are in one-to-one correspondence and thus are interchangeable. The panel refers to an antenna panel, and one Transmission Reception Point (TRP) or communication node (including, but not limited to, a terminal, a base station, or the like) may include at least one antenna panel. Each panel has one or more antenna arrays, and multiple antenna arrays may be virtualized into one antenna port. The antenna ports on one panel may be put into one port group. One panel may further be divided into multiple sub-panels, and multiple antenna ports included in each sub-panel may be put into one port group. For example, for a dual-polarized antenna, a positive 45° polarized antenna is one sub-panel, and a negative 45° polarized antenna is another sub-panel. In the embodiments of the present disclosure, both the panel and the sub-panel are referred to as panels, and the panel herein may be replaced by a port group.

In a standard such as NR, a PDCCH needs to be mapped to a group of resource elements (RE) including, for example, one or more Control Channel Elements (CCE), wherein one RE includes one sub-carrier in a frequency domain and one symbol in a time domain, and one CCE includes multiple REs. A set of one or more CCEs for transmitting a PDCCH is sometimes referred to as a Control Resource Set (CORE-SET), and includes multiple physical resource blocks in a frequency domain and K symbols in a time domain, where K is a natural number, for example, K may be equal to 1, 2, or 3. In order to detect a PDCCH, candidate PDCCHs of a certain aggregation level are configured as a set, and the set of candidate PDCCHs under this aggregation level is a Search Space (SS). Multiple search spaces form a search space set (referred to as SS set, SSSET, or SSS). Each terminal may be configured with at least one search space set. In order to detect a PDCCH, a PDCCH detection occasion, candidate PDCCHs to be detected, or candidate PDCCHs may be configured for the current UE in the search space. In addition, the PDCCH includes multiple formats, each format corresponds to downlink control information (DCI) in the corresponding format, and each DCI further includes multiple signaling indication domains. Herein, the detection may also be referred to as monitoring or blind detection, and is mainly used for determining which PDCCH among multiple candidate PDCCHs is the PDCCH for transmitting downlink control information to the current terminal.

The transmission in the embodiments of the present disclosure may refer to sending or receiving. For example, the transmission of data or signals may refer to the sending of data or signals, and may also refer to the receiving of data or signals. The signals herein include various reference signals. The data includes data transmitted by a PUSCH or a PDSCH.

In the embodiments of the present disclosure, in order to better transmit a PUSCH or a PDSCH, a group of Resource Elements (RE) occupying K1 continuous symbols and L1 frequency-domain sub-carriers form one Resource block (abbreviated as RB, sometimes also called a physical resource block abbreviated as PRB), where K1 and L1 are positive integers, for example, K1=12 or 14, and L1=12. Here, one RE includes a minimum resource unit for carrying one modulation signal corresponding to one symbol and one subcarrier.

In order to demodulate or acquire information (including data or signals) carried on a physical channel modulated on an RE, a value of a radio channel on the RE needs to be estimated, the value is generally estimated based on a Demodulation Reference Signal (DMRS), and a channel on the physical channel is obtained by using channel interpolation on the RE corresponding to the DMRS.

In the embodiments of the present disclosure, a Radio Network Temporary Identifier (RNTI) is used as the identifier of the second communication node and is carried in the signal information between the first communication node and the second communication node. The RNTI mainly includes at least one of: an SI-RNTI for identifying a system message, a P-RNTI for identifying paging information, an RA-RNTI for identifying a resource block used for sending a random access preamble by a UE, a C-RNTI for identifying a user service, a TPC-PUCCH-RNTI for identifying PUCCH uplink power control information, and a TPC-PUSCH-RNTI for identifying PUSCH uplink power control information.

In the related art, multiple transmission signals may be originated from multiple communication nodes (such as a transmission node and a base station), M transmission signals may be originated from M different TRPs, or from M different antenna panels, or M different Bandwidth Parts (BWP), or M different Carrier Components (CC), where the M panels, the M BWPs or the M CCs may belong to the same TRP, or may belong to multiple TRPs. In order to distinguish control channels originated from different TRPs, candidate CORESETs may be divided into groups, each group including at least one CORESET, and each CORESET corresponding to a higher layer parameter index, such as a CORESET group index coresetPoolIndex-r16. When multiple transmission signals are originated from different transmission nodes, physical downlink control information may be notified by using one DCI, and this mode is called joint transmission based on single physical downlink control information (Single DCI); or physical downlink control information may be notified by using two or more DCI, and this mode is called joint transmission based on multiple physical downlink control information (Multi DCI).

Hybrid Automatic Repeat Request (HARQ) technology is proposed in order to improve reliability, that is, after a terminal or a base station receives a transmission block, if it is detected that the reception is correct, an Acknowledgement (ACK) is fed back, otherwise, a Negative Acknowledgement (NACK) is fed back. Herein, ACK and NACK messages may be collectively referred to as HARQ acknowledgement, and may also be referred to as one of: HARQ acknowledgement information, HARQ-ACK information, HARQ-ACK, HARQ-ACK acknowledgement, ACK/NACK information, and ACK/NACK codebook. If no special description is provided, the ACK/NACK in the embodiments of the present disclosure may also be referred to as HARQ-ACK.

In the related art, a HARQ-ACK bit set, such as a HARQ-ACK codebook or a HARQ-ACK sub-codebook, is generated for all serving cells (or Carrier Components (CC)) corresponding to at least one TRP and PUCCH detection occasions satisfying requirements and configured by a higher layer, and is fed back in a PUCCH resource or a PUSCH resource.

The priorities of different ACK information may be determined according to at least one of higher layer signaling, physical-layer signaling or a certain manner. The priorities of the ACK information corresponding to a transmission signal satisfy at least one of the following features: ACKs with the same priority may be combined into the same HARQ-ACK codebook, and ACKs with different priorities cannot be combined into the same HARQ-ACK codebook; and ACKs with the same priority may be merged into a physical uplink channel for transmission, and ACKs with different priorities cannot be combined into a physical uplink channel for transmission.

When the number N0 of TCI states configured by RRC is larger than a configured threshold N1, a set of N1 TCI states or TCI state groups needs to be selected from the N0 TCI states according to the MAC CE, and then one TCI state or TCI state group needs to be selected from the TCI state set according to the TCI field of the DCI to indicate the QCL value that needs to be used by the terminal. The value of the TCI field, for indicating the TCI state or the TCI state group, in the DCI is a code point which is also referred to as TCI codepoint, and each code point is associated with one TCI state or TCI state group, wherein the TCI state group includes at least two TCI states. Table 1 is a TCI state mapping table in the related art, and one association mode is exemplarily shown in Table 1.

TABLE 1

| TCI state mapping table | |
|---|---|
| Code point | TCI state |
| 000 | TCI state2 |
| 001 | TCI state1, TCI state5 |
| 010 | TCI state3 |
| 011 | TCI state6 |
| 100 | TCI state4 |
| 101 | TCI state1, TCI state 18 |
| 110 | TCI state18 |
| 111 | TCI state 4, TCI state 8 |

In the embodiments of the present disclosure, the preset transmission configuration indicator code point (TCI code point) is the first TCI code point for which the number of TCI states is greater than or equal to 2 in a TCI state mapping table corresponding to a transmission signal. That is, the preset TCI code point is the first TCI code point, which includes more than one TCI state, in the TCI code points. The set of TCI code points is defined based on each BWP or CC. One TCI code point is a value of a TCI field in a DCI, and the value indicates one or a group of TCI states from a TCI state set determined by RRC or MAC CE.

The spatial parameter associated with the transmission signal refers to one of: a spatial parameter corresponding to the transmission signal, a spatial parameter used for sending the transmission signal, a spatial parameter used for receiving the transmission signal, and a reference signal quasi-co-located with the transmission signal.

The operation modes of the spatial parameter determination method and device according to the embodiments of the present disclosure are described below.

Embodiment 1

This embodiment provides a spatial parameter determination method. FIG. 2 is a flowchart (1) of a spatial parameter determination method according to an embodiment of the present disclosure. As shown in FIG. 2, the spatial parameter determination method in this embodiment includes operations S102 and S104.

At S102, priority information of N types of transmission signals is determined according to first configuration information, wherein N is an integer greater than 1.

At S104, spatial parameter information corresponding to a same symbol is determined according to the priority information, wherein the spatial parameter information is used for transmitting at least one type of transmission signals in the N types of transmission signals.

It should be further noted that, in the above embodiment, the transmission signal may be a reference signal, a physical control channel, a physical shared channel, or the like, which is not limited in the embodiments of the present disclosure; the symbol may generally be a time domain symbol; and the priority information is used to indicate the priority of the transmission signal.

It should be further noted that, in the above embodiment, the spatial parameter information corresponding to the same symbol may be determined according to the priority information of the transmission signals, and at least one transmission signal is transmitted according to the beam corresponding to the determined spatial parameter of the transmission signal, for example, according to the reception beam for receiving the at least one transmission signal. Here, the at least one transmission signal may be all transmission signals of the N types of transmission signals, or may also be K transmission signals with high priorities in the transmission signals.

According to the spatial parameter determination method in this embodiment, the priority information of N types of transmission signals can be determined according to first configuration information, wherein N is an integer greater than 1; and spatial parameter information corresponding to the same symbol can be determined according to the priority information, wherein the spatial parameter information is used for transmitting at least one type of transmission signals in the N types of transmission signals. Therefore, the embodiment of the present disclosure solves the problem in the related art of how to effectively determine a spatial parameter corresponding to the same symbol, so as to effectively transmit the at least one type of transmission signals on the same symbol by using the spatial parameter.

In some exemplary implementations, the spatial parameter determination method in this embodiment can effectively determine a corresponding spatial parameter when N transmission signals are involved in the same symbol in a scenario of Multi-TRP transmission or Multi-Panel transmission or high-frequency transmission. For example, in a process that the UE receives multiple PDSCHs, such as PDSCH1 and PDSCH2, the spatial parameter determination method in this embodiment enables the UE to determine to use a reception beam corresponding to the transmission signals with higher priorities as the reception beam of PDSCH1 and PDSCH2.

In an embodiment, in the N types of transmission signals, the same type of transmission signals are associated with the same spatial parameter information, and different types of transmission signals are associated with different spatial parameter information.

In an embodiment, in the above operation S104, determining the spatial parameter information corresponding to the same symbol according to the priority information includes:

determining spatial parameter information associated with K types of transmission signals with high priorities in the N types of transmission signals as the spatial parameter information corresponding to the same symbol, wherein K is a positive integer less than or equal to T, T is a maximum value of the number of spatial parameters corresponding to the same symbol, and T is configured by a higher layer or is determined according to a User Equipment (UE) capability.

It should be further noted that, in the above embodiment, the K types of transmission signals are multiple types of transmission signals with high priorities in the N types of transmission signals. There may be multiple manners for determining the K types of transmission signals, part of which are listed below. Multiple types of transmission signals with relatively high priorities in the N types of transmission signals may be selected as the K types of transmission signals, for example, when there are N types of transmission signals (for example, N is 5), the N types of transmission signals may be sorted according to the priority from high to low, and the first K types of transmission signals with high priorities are selected as the K types of transmission signals (for example, K is 3) in the above embodiment. Alternatively, multiple transmission signals with the highest priority may be directly selected from the N types of transmission signals as the K types of transmission signals, for example, when there are N types of transmission signals (for example, N is 5) in this embodiment, and the N types of transmission signals have two different priorities (a high priority and a low priority), that is, multiple transmission signals with the high priority may be selected as the K types of transmission signals.

On the other hand, for the same symbol, the maximum value T of the number of spatial parameters corresponding to the same symbol, i.e., the maximum number of the spatial parameters, may be configured by a higher layer or may be determined according to a UE capability, where the value of K needs to satisfy the limitation of T.

It should be further noted that, in the above embodiment, the number of spatial parameters of the same symbol is the maximum number of spatial parameters that can be transmitted by a communication node in a same time domain symbol. In such a case, according to the technical solution in the above embodiment, the number of the determined spatial parameters may correspond to the number of spatial parameters that can be used by the communications node in a same time domain symbol. By means of the technical solution provided in the described embodiment, spatial parameters can be determined for multiple transmission signals (for example, transmission signals sent by different CCs or BWPs) sent by one TRP, or for multiple transmission signals sent by different TRPs.

In an embodiment, in the above operation S104, determining the spatial parameter information corresponding to the same symbol according to the priority information includes:

dividing the N types of transmission signals into C transmission signal groups according to second configuration information, wherein one or more types of transmission signals in each transmission signal group are associated with the same second configuration information, and C is a positive integer smaller than or equal to N. In another embodiment, the second configuration information may be divided into C groups according to higher layer signaling or in a preset manner, each group of second configuration information includes at least one piece of second configuration information, and one or more transmission signals associated with the same transmission signal group of second configuration information are put into one transmission signal group. For example, if the second configuration information is a CORESET group, transmission signals corresponding to the same COSRESET group index form a group. For example, if the second configuration information X is divided into C groups, then transmission signals corresponding to the same group index of the second configuration information X form one transmission signal group, where X may be replaced by one of CORESET index information, priority information of Acknowledgement (ACK) information corresponding to a transmission signal, Priority Indicator (PI) information in physical downlink control information, virtual cell number information, Physical Cell Identity (PCI) information, Radio Network Temporary Identifier (RNTI) type information, parameter information of Downlink Control Information (DCI), scheduling time interval information, channel type information, or Carrier Component (CC) index information.

It should be further noted that, in the above embodiment, the N types of transmission signals are divided into C transmission signal groups according to the second configuration information, that is, the N types of transmission signals are divided according to the second configuration information to obtain the C transmission signal groups.

It should be further noted that, for the multiple types of transmission signals in the same transmission signal group, the priorities of the multiple types of transmission signals in the transmission signal group and their spatial parameters are also determined according to the method for determining the priorities of the transmission signals in this embodiment. For the transmission signals in different groups, since these transmission signals can be received at the same time and there is no need to further determine the priorities of these transmission signals, it is only needed to use the spatial parameters corresponding to their respective transmission signal groups, or other preset methods may also be used, which are not limited in the embodiments of the present disclosure.

In an embodiment, the second configuration information may include at least one of:

Control Resource Set (CORESET) group information; CORESET index information; priority information of Acknowledgement (ACK) information corresponding to a transmission signal; Priority Indicator (PI) information in physical downlink control information; virtual cell number information; Physical Cell Identity (PCI) information; Radio Network Temporary Identifier (RNTI) type information; parameter information of Downlink Control Information (DCI); scheduling time interval information; channel type information; and Carrier Component (CC) index information.

In an embodiment, in the above operation S104, determining the spatial parameter information corresponding to the same symbol according to the priority information includes:

for an ith transmission signal group in the C transmission signal groups, determining spatial parameter information associated with $K_i$ types of transmission signals with high priorities in the ith transmission signal group as the spatial parameter information, used for the one or more types of transmission signals in the ith transmission signal group, corresponding to the same symbol, wherein i is a positive integer less than or equal to C;

wherein $K_i$ is a positive integer less than or equal to $T_i$; $T_i$ is a maximum value of the number of spatial parameters corresponding to the ith transmission signal group in the same symbol, and $T_i$ is configured by a higher layer or is determined according to a UE capability.

It should be further noted that the ith transmission signal group is any transmission signal group in the C transmission signal groups, i.e., i=1, 2, 3, . . . , C−1, C. The $K_i$ types of transmission signals in the ith transmission signal group are transmission signals with high priorities in the ith transmission signal group. There are multiple methods for determining the $K_i$ types transmission signals in the ith transmission signal group. For example, in the plurality of types of transmission signals of the ith transmission signal group, multiple types of transmission signals with high priorities may be selected as the $K_i$ types of transmission signals (for example, the transmission signals are sorted in a descending order of the priorities of the transmission signals, and the former $K_i$ types of transmission signals with high priorities are selected as the $K_i$ types of transmission signals). For another example, multiple types of transmission signals with the highest priority are directly selected as the $K_i$ types of transmission signals in the N types of transmission signals. For a specific manner of determining the $K_i$ types of transmission signals, reference may be made to the above selection of the K types of transmission signals, and details are not repeatedly described herein.

For each ith transmission signal group, a maximum value of the number of spatial parameters corresponding to the ith transmission signal group in the same symbol, that is, the maximum number of spatial parameters, may be configured by a higher layer or may be determined according to a UE capability, where the value of $K_i$ needs to be limited by $T_i$.

In an embodiment, a set formed by the $K_i$ types of transmission signals corresponding to respective transmission signal groups of the C transmission signal groups includes K types of transmission signals, and a sum of multiple $K_i$ is equal to K.

Herein, K is a positive integer less than or equal to T; the K types of transmission signals are one or more types of transmission signals with high priorities in the N types of transmission signals; and T is a maximum value of the number of spatial parameters corresponding to the same symbol, and T is configured by a higher layer or is determined according to a User Equipment (UE) capability.

It should be further noted that, the sum of the values $K_i$ corresponding to the $K_i$ types of transmission signals in respective transmission signal groups of the C transmission signal groups is equal to the number K corresponding to the K types of transmission signals, that is, the sum of multiple $K_i$ is equal to K.

In an embodiment, the spatial parameter determination method in this embodiment further includes:

determining M types of transmission signals with high priorities from the C transmission signal groups, wherein M is a positive integer greater than T; and determining, according to the priority information of the transmission signals, the spatial parameter information associated with T types of transmission signals with high priorities in the M types of transmission signals as the spatial parameter information corresponding to the same symbol.

In an embodiment, the first configuration information may include at least one of:

CORESET group information; CORESET index information; priority information of ACK information corresponding to a transmission signal; PI information in physical downlink control information; virtual cell number information; PCI information; RNTI type information; parameter information of DCI; scheduling time interval information; channel type information; and CC index information.

In an embodiment, in the operation S102, determining the priority information of the N types of transmission signals according to the first configuration information includes:

in a case where the first configuration information is the CORESET group information, determining the priority information of each transmission signal based on a criteria that the smaller a CORESET group index of the CORESET group information corresponding to the transmission signal is, the higher a priority indicated by the priority information of the transmission signal is; or, in a case where the first configuration information is the CORESET index information, determining the priority information of each transmission signal based on a criteria that the smaller a CORESET index corresponding to the transmission signal is, the higher a priority indicated by the priority information of the transmission signal is; or, in a case where the first configuration information is the priority information of the ACK information corresponding to the transmission signal, determining the priority information of each transmission signal based on a criteria that the higher the priority information of the ACK information corresponding to the transmission signal is, the higher a priority indicated by the priority information of the transmission signal is, wherein the priority information of the ACK information corresponding to the transmission signal is determined by higher layer signaling or is determined in a preset manner; or, in a case where the first configuration information is the PI information in the physical downlink control information, determining the priority information of each transmission signal based on a criteria that the higher the PI information in the physical downlink control information corresponding to the transmission signal is, the higher a priority indicated by the priority information of the transmission signal is, wherein the PI information in the physical downlink control information is determined by higher layer signaling or is determined in a preset manner; or, in a case where the first configuration information is the virtual cell number, determining the priority information of each transmission signal based on a criteria that the smaller the virtual cell number corresponding to the transmission signal is, the higher a priority indicated by the priority information of the transmission signal is; or, in a case where the first configuration information is the PCI information, determining the priority information of each transmission signal based on a criteria that the smaller the PCI information corresponding to the transmission signal is, the higher a priority indicated by the priority information of the transmission signal is; or, in a case where the first configuration information is the RNTI type information, determining the priority information of each transmission signal based on a criteria that the higher the priority information of a RNTI type corresponding to the transmission signal is, the higher a priority indicated by the priority information of the transmission signal is, wherein the priority information of the RNTI type is determined by higher layer signaling or is determined in a preset manner; or, in a case where the first configuration information is the parameter information of the DCI, determining the priority information of each transmission signal based on a criteria that the higher the priority information of the parameter information of the DCI corresponding to the transmission signal is, the higher a priority indicated by the priority information of the transmission signal is, wherein the priority information of the parameter information of the DCI is determined by higher layer signaling or is determined in a preset manner; or, in a case where the first configuration information is the channel type information, determining the priority information of each transmission signal based on a criteria that the higher the priority information of the channel type information corresponding to the transmission signal is, the higher a priority indicated by the priority information of the transmission signal is, wherein the priority information of the channel type information is determined by higher layer signaling or is determined in a preset manner; or, in a case where the first configuration information is the scheduling time interval information, determining the priority information of each transmission signal based on a criteria that the greater a scheduling time interval corresponding to the transmission signal is, the higher a priority indicated by the priority information of the transmission signal is; or, in a case where the first configuration information is the CC index information, determining the priority information of each transmission signal based on a criteria that the smaller a CC index corresponding to the transmission signal is, the higher a priority indicated by the priority information of the transmission signal is.

In an embodiment, the spatial parameter determination method in this embodiment further includes:

in a case where the transmission signal has no associated CORESET group or CORESET, determining an associated CORESET group or CORESET for the transmission signal. For example, if the transmission signal has no corresponding CORESET group, the index of the CORESET group corresponding to the transmission signal is 0 by default; if the transmission signal has no corresponding CORESET, the index of the CORESET corresponding to the transmission signal is 0 by default.

In an embodiment, the spatial parameter information includes at least one of:

a quasi-co-located parameter; a quasi co-located reference signal; a quasi co-located reference signal associated with a spatial reception parameter; a spatial transmission filter; and a spatial relation reference signal.

It should be further noted that the spatial parameter determination method according to the embodiments of the present disclosure is applicable to a first communication node and a second communication node. The first communication node sends a transmission signal by using the spatial parameter determined by the method according to the embodiment of the present disclosure, for example, determines a transmission beam used for sending the transmission signal. The second communication node may receive the transmission signal using the spatial parameter determined by the method in the embodiment of the present disclosure, for example, determines a reception beam used for receiving the transmission signal.

The spatial parameter determination method in this embodiment is further elaborated below by multiple exemplary embodiments.

Exemplary Embodiment 1

In an exemplary embodiment, at least one first communication node is involved, and N CORESET groups are configured, wherein each CORESET group includes at least one CORESET. A higher layer parameter index coresetPoolIndex-r16 of the CORESETs in the same CORESET group has the same value, therefore the priority of the transmission signal can be determined according to the coresetPoolIndex-r16 value in the CORESET group, for example, the smaller the coresetPoolIndex-r16 value of the CORESET corresponding to the scheduled transmission signal is, the higher the priority of the transmission signal corresponding to the CORESET is. In another aspect, the transmission signals may be divided into groups by using the CORESET group. For example, when the CORESETs corresponding to the scheduled transmission signals have the same coresetPoolIndex-r16 value, the transmission signals may be put into the same transmission signal group. N is an integer greater than 1, and without loss of generality, it is assumed herein that N=2, wherein the CORESET group 1 includes CORESET1 and CORESET2, and the value of coresetPoolIndex-r16 corresponding to each CORESET is 0; and the CORESET group 2 includes CORESET3 and CORESET4, and the value of coresetPoolIndex-r16 corresponding to each CORESET is 1. The transmission signal 1 and the transmission signal 2 are scheduled respectively by using DCI1 in the CORESET1 in the CORESET group 1 and DCI3 in the CORESET3 in the CORESET group 2. If the value of the COREST group index coresetPoolIndex-r16 of the CORESET2 corresponding to the DCI1 is 0, and the value of the COREST group index coresetPoolIndex-r16 of the CORESET2 corresponding to the DCI3 is 1, then the priority of the transmission signal 1 is higher than the priority of the transmission signal 2.

If the transmission signal 1 and the transmission signal 2 are scheduled respectively using DCI1 in the CORESET1 in the CORESET group 1 and DCI2 in the CORESET2 in the CORESET group 1, since the CORESET group indexes corresponding to the DCI1 and the DCI2 have the same value, the transmission signal 1 and the transmission signal 2 may be put into the same transmission signal group, and the priorities of the spatial parameters of the transmission signal 1 and the transmission signal 2 need to be determined according to at least one of a CORESET index, virtual cell number information, PCI information, RNTI type information, parameter information of DCI, scheduling time interval information, channel type information, CC index information, etc., and a spatial parameter used for transmitting the transmission signals in the transmission signal group is determined according to the priorities of the spatial parameters of the transmission signals.

Based on the above description, since the priority of the transmission signal 1 is higher than the priority of the transmission signal 2, it is determined that the spatial parameter corresponding to the transmission signal 1 is a preferred spatial parameter, that is, if the transmission signal 1 and the transmission signal 2 are transmitted in the same symbol, then the spatial parameter associated with the transmission signal 1 is preferentially used as the spatial parameter corresponding to this symbol, and the transmission signal 1 and the transmission signal 2 are received using the beam determined by this spatial parameter. It should be noted that the number of spatial parameters finally used for receiving the transmission signals may be greater than 1, then the final spatial parameters are spatial parameters corresponding to K transmission signals with high priorities, or spatial parameters corresponding to $K_i$ transmission signals with high priorities in each transmission signal group, where $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 2

In an exemplary embodiment, at least one first communication node is involved, and N CORESETs are configured, wherein each CORESET has a CORESET index controlResourceSetId for identifying the CORESET. The priority of the transmission signal can be determined according to the value of the CORESET index controlResourceSetId, for example, the smaller the value of the controlResourceSetId of the CORESET corresponding to the DCI of the scheduled transmission signal is, the higher the priority of the transmission signal corresponding to the CORESET is. In addition, the controlResourceSetId indexes may be divided into multiple controlResourceSetId sets, and the controlResourceSetId sets may be configured by higher layer signaling, or may be formed in an agreed manner, for example, the controlResourceSetId indexes smaller than A1 belong to a controlResourceSetId set, and the controlResourceSetId indexes larger than A1 belong to another controlResourceSetId set. If the CORESET indexes corresponding to DCI of multiple scheduled transmission signals are in the same controlResourceSetId set, the transmission signals can be put into the same transmission signal group. N is an integer greater than 1, and without loss of generality, it is assumed herein that N=4, wherein CORESET1, CORESET2, CORESET3 and CORESET4 are configured, and the values of the CORESET indexes corresponding to these CORESETs are respectively 0-3. In addition, when setting A1=2, the transmission signals scheduled by the DCI corresponding to CORESET1 and CORESET2 belong to one transmission signal group, and the transmission signals scheduled by the DCI corresponding to CORESET3 and CORESET4 belong to another transmission signal group. In a specific transmission process, the transmission signal 1 and the transmission signal 2 are scheduled respectively by using DCI1 in the CORESET1 and DCI3 in the CORESET3. Since the value of the COREST index of the CORESET corresponding to DCI1 is 0, and the value of the COREST index of the CORESET corresponding to DCI3 is 2, the priority of the transmission signal 1 is higher than the priority of the transmission signal 2.

If the transmission signal 1 and the transmission signal 2 are scheduled respectively using DCI1 in the CORESET1 and DCI2 in the CORESET2, since the DCI1 and the DCI2 are in the same CORESET index set, the transmission signal 1 and the transmission signal 2 may be put into the same transmission signal group, and since the CORESET index corresponding to the DCI1 is smaller than the CORESET index corresponding to the DCI2, the priority of the spatial parameter of the transmission signal 1 is higher than the priority of the spatial parameter of the transmission signal 2. Of course, for the transmission signals of the same transmission signal group, the priorities of the transmission signals may also be determined by using other information except the CORESET index in the second configuration information.

Based on the above description, since the priority of the transmission signal 1 is higher than the priority of the transmission signal 2, it is determined that the spatial parameter corresponding to the transmission signal 1 is a preferred spatial parameter, that is, if the transmission signal 1 and the transmission signal 2 are transmitted in the same symbol, then the spatial parameter associated with the transmission signal 1 is preferentially used as the spatial parameter corresponding to the symbol, and the transmission signal 1 and the transmission signal 2 are received using the beam determined by this spatial parameter. It should be noted that the number of spatial parameters finally used for receiving the transmission signals may be greater than 1, then the final spatial parameters are spatial parameters corresponding to K transmission signals with high priorities, or spatial parameters corresponding to $K_i$ transmission signals with high priorities in each transmission signal group, where $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 3

In an exemplary embodiment, at least one first communication node is involved, and the first communication node may simultaneously transmit multiple service types, including an Ultra-reliable and Low Latency Communications (URLLC) service and an Enhanced Mobile Broadband (eMBB) service. The priorities of the URLLC and the eMBB are indicated mainly according to PI information in the physical downlink control information, that is, the value in a Priority indicator field in a downlink control format 0-1, 0-2, 1-1 or 1-2 (DCI0_1 or DCI0_2, DCI1_1 or DCI1_2), and the larger the PI value in the DCI is, the higher the priority of a transmission signal corresponding to the DCI is, and the transmission signal can be transmitted preferentially. For example, when the PI value of the DCI corresponding to the first transmission signal is 1 and the PI value of the DCI corresponding to the second transmission signal is 0, the priority of the second transmission signal is lower than the priority of the first transmission signal. The terminal may determine the priorities of the eMBB and the URLLC according to the received PI indicator, and determine the spatial parameter of the transmission signals according to the priorities of the eMBB and the URLLC. For example, if the PI indicates that the priority of the eMBB is higher, the priority of the transmission signal related to the eMBB is higher than the priority of the transmission signal related to the URLLC; otherwise, the priority of the transmission signal related to the eMBB is lower than the priority of the transmission signal related to the URLLC. In addition, the transmission signals may be divided into groups according to the PI indicators, for example, the transmission signals corresponding to a PI value of 1 belong to one transmission signal group, and the transmission signals corresponding to a PI value of 0 belong to another group. In addition, with regard to the transmission signals in the same transmission signal group, the priorities of the transmission signals in the transmission signal group are determined according to at least one of a CORESET group index, a CORESET index, virtual cell number information, PCI information, RNTI type information, parameter information of DCI, scheduling time interval information, channel type information and CC index information, etc., and a spatial parameter used for transmitting the transmission signals is determined according to the priorities of the transmission signals, wherein the spatial parameter is a spatial parameter corresponding to K transmission signals with high priorities, or a spatial parameter corresponding to $K_i$ transmission signals with high priorities in each transmission signal group, where $K_i$ is a positive integer and is the maximum number of spatial parameters of the ith transmission signal group, the sum of $K_i$ of all the transmission signal groups is less than K, i=1, . . . , C, C is the number of the transmission signal groups, K is an integer greater than or equal to 1, and K and $K_i$ are configured by higher layer signaling or are determined according to a UE capability.

Exemplary Embodiment 4

In an exemplary embodiment, at least one first communication node is involved, and each first transmission node may simultaneously transmit multiple transmission signals, such as transmission signal 1, transmission signal 2, transmission signal 3, and transmission signal 4. Virtual cell information vPCI is configured for the transmission signals via higher layer signaling or physical layer signaling, where the virtual cell information is used for generating a sequence or a scrambling code of the transmission signal and it is assumed that the virtual cell information vPCI of the transmission signal 1 to the transmission signal 4 is 1-4, respectively. The terminal may determine the priorities of the transmission signals according to the received vPCI, for example, the lower the virtual cell number corresponding to the transmission signal is, the higher the priority of the transmission signal is. In another aspect, the transmission signals may be divided into groups according to virtual cell numbers, for example, the virtual cell numbers are divided into multiple virtual cell number groups according to a configured or agreed manner. The transmission signals corresponding to virtual cell numbers belonging to the same virtual cell number set are put into one transmission signal set. For the transmission signals in the same transmission signal set, the priorities of the transmission signals can be further determined according to the virtual cell numbers corresponding to the transmission signals, for example, the priority of the transmission signal corresponding to a smaller virtual cell number is higher. Of course, for the transmission signals in the same transmission signal set, the priorities of the transmission signals may also be determined by using other information except the virtual cell number in the second configuration information. Further, a spatial parameter used for transmitting the transmission signals can be determined according to the priorities of the transmission signals, wherein the spatial parameter is a spatial parameter corresponding to K transmission signals with high priorities, or is a spatial parameter corresponding to $K_i$ transmission signals with high priorities in each transmission signal group, $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 5

In an exemplary embodiment, at least one first communication node is involved, and each first transmission node may simultaneously transmit multiple transmission signals, such as transmission signal 1, transmission signal 2, transmission signal 3, and transmission signal 4. PCI information may be configured for the transmission signals via higher layer signaling or physical layer signaling, wherein the PCI information is used for generating a sequence or a scrambling code of the transmission signal, or is used for identifying a physical cell corresponding to the transmission signal, and it is assumed that the PCI information of the transmission signal 1 to the transmission signal 4 is 1-4, respectively. The terminal may determine the priorities of the transmission signals according to the received PCI, for example, the lower the PCI corresponding to the transmission signal is, the higher the priority of the transmission signal is. In another aspect, the transmission signals may be divided into groups according to the PCI information, for example, the PCI may be divided into multiple PCI groups according to a configured or agreed manner. The transmission signals corresponding to PCI belonging to the same PCI group are put into one transmission signal group. For the transmission signals in the same transmission signal group, the priorities of the transmission signals can be further determined according to the PCI corresponding to the transmission signals, for example, the transmission signals with a smaller PCI have higher priorities. Of course, for the transmission signals in the same transmission signal group, the priorities of the transmission signals may also be determined according to other information except the physical cell number in the second configuration information. Further, a spatial parameter used for transmitting the transmission signals can be determined according to the priorities of the transmission signals, wherein the spatial parameter is a spatial parameter corresponding to K transmission signals with high priorities, or is a spatial parameter corresponding to $K_i$ transmission signals with high priorities in each transmission signal group, $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 6

In an exemplary embodiment, at least one first communication node is involved, and each first transmission node may simultaneously transmit multiple transmission signals, such as transmission signal 1, transmission signal 2, transmission signal 3, and transmission signal 4. Multiple carrier components (CCs) are configured for the transmission signals via higher layer signaling or physical layer signaling, and the CCs are used for transmitting at least one of the transmission signal 1 to transmission signal 4. It is assumed that the corresponding CC indexes of the transmission signals 1 to 4 are 0-3, respectively. The terminal may determine the priorities of the transmission signals according to the received CC indexes, for example, the lower the CC index corresponding to the transmission signal is, the higher the priority of the transmission signal is. In another aspect, the transmission signals may be divided into groups according to the CC indexes, for example, the CC indexes are divided into multiple CC index groups according to a configured or agreed manner. The transmission signals corresponding to CC indexes belonging to the same CC index group are put into one transmission signal group. For the transmission signals in the same transmission signal group, the priorities of the transmission signals in the transmission signal group can be further determined according to the CC indexes corresponding to the transmission signals, for example, the transmission signals corresponding to smaller CC indexes have higher priorities. Of course, for the transmission signals in the same transmission signal group, the priorities of the transmission signals may also be determined by using other information except the CC index in the second configuration information. Further, a spatial parameter used for transmitting the transmission signals can be determined according to the priorities of the transmission signals, wherein the spatial parameter is a spatial parameter corresponding to K transmission signals with high priorities, or is a spatial parameter corresponding to $K_i$ transmission signals with high priorities in each transmission signal group, $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 7

In an exemplary embodiment, at least one first communication node is involved, and each first transmission node may simultaneously transmit multiple transmission signals, such as transmission signal 1, transmission signal 2, transmission signal 3, and transmission signal 4. The transmission signal includes at least one of various reference pilots, a PDSCH and a PUSCH, and scheduling time interval information corresponding to the transmission signal 1 to the transmission signal 4 is T1-T4. The scheduling time interval information is the interval between the last symbol occupied by the RE resource corresponding to the DCI associated with the transmission signal and the first symbol of the RE resource for transmitting the transmission signal. The DCI associated with the transmission signal refers to a DCI scheduling a PDSCH or a PUSCH, or a DCI triggering an aperiodic reference signal, or a DCI activating a semi-persistent reference signal. The terminal may determine the priorities of the transmission signals according to the scheduling time interval information, for example, the larger the scheduling time interval information corresponding to the transmission signal is, the higher the priority of the transmission signal is. In another aspect, the transmission signals may be divided into groups according to the scheduling time interval information, for example, the scheduling time interval information may be divided into multiple scheduling time interval information groups according to a configured or preset manner. The transmission signals corresponding to the time interval information belonging to the same time interval information group are put into one transmission signal group. For the transmission signals in the same transmission signal group, the priorities of the transmission signals can be further determined according to the scheduling time interval information corresponding to the transmission signals, for example, the transmission signals corresponding to larger scheduling time interval information have higher priorities. Of course, for the transmission signals in the same transmission signal group, the priorities of the transmission signals may also be determined according to other information except the scheduling time interval information in the second configuration information. A spatial parameter used for transmitting the transmission signals is determined according to the priorities, wherein the spatial parameter is a spatial parameter corresponding to K transmission signals with high priorities, or a spatial parameter corresponding to $K_i$ transmission signals with high priorities in each transmission signal group, $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 8

In an exemplary embodiment, at least one first communication node is involved, and each first transmission node may simultaneously transmit multiple transmission signals, such as transmission signal 1, transmission signal 2, transmission signal 3, and transmission signal 4. The respective transmission signals may be scrambled with different RNTIs, and it is assumed that the RNTIs corresponding to the transmission signal 1 to the transmission signal 4 are RNTI1 to RNTI4, respectively. The terminal can determine the priorities of the transmission signals according to the received RNTI information, for example, the transmission signals scrambled with an S-RNTI of the system information type or a P-RNTI of the paging type have higher priorities, the transmission signals scrambled with a TPC-PUCCH-RNTI and a TPC-PUSCH-RNTI of the control signaling type have priorities lower than that of the transmission signals scrambled with the S-RNTI of the system information type or the P-RNTI of the paging type, and the transmission signals scrambled with an SPS C-RNTI and a C-RNTI of the transmission data type have the lowest priorities. Of course, priorities of different RNTIs are not limited to the examples herein, and the priorities corresponding to different RNTIs may be determined according to an agreed manner or configured by higher layer signaling. The priorities of the transmission signals are determined according to the priorities of the RNTIs associated with the transmission signals. In addition, the transmission signals may be divided into groups according to the RNTIs associated with the transmission signals, for example, the RNTIs may be divided into multiple RNTI groups according to a configured or agreed manner, and the transmission signals corresponding to the RNTIs belonging to the same RNTI group are put into one transmission signal group. For the transmission signals in the same transmission signal group, the priorities of the transmission signals in the transmission signal group can be determined according to the priorities of the RNTIs corresponding to the transmission signals, for example, the transmission signals corresponding to RNTIs with high priorities have high priorities. Of course, for the transmission signals in the same transmission signal group, the priorities of the transmission signals may also be determined by using other information except the RNTI in the second configuration information. Further, a spatial parameter used for transmitting the transmission signals can be determined according to the priorities of the transmission signals, wherein the spatial parameter is a spatial parameter corresponding to K transmission signals with high priorities, or is a spatial parameter corresponding to $K_i$ transmission signals with high priorities in each transmission signal group, $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 9

In an exemplary embodiment, at least one first communication node is involved, and each first transmission node may simultaneously transmit multiple transmission signals, such as transmission signal 1, transmission signal 2, transmission signal 3, and transmission signal 4. The respective transmission signals correspond to different parameter information of Downlink Control Information (DCI). The parameter information of the DCI includes at least one of: a format of the DCI, a scrambling sequence of the DCI, a search space index corresponding to the DCI, a CORESET index corresponding to the DCI, and a CORESET group index corresponding to the DCI. It is assumed that the transmission signal 1-transmission signal 4 correspond to DCI parameter information 1 to DCI parameter information 4. The terminal can determine the priorities of the transmission signals according to the received DCI parameter information. For example, the transmission signals with smaller search space indexes corresponding to the DCI have higher priorities. For another example, the priorities of the transmission signals may be determined according to the priorities of the corresponding DCI formats, wherein the priorities of the DCI formats decrease in an order of formt0-0, format1-0, format2-0, format0-1, format1-1, format2-1, format2-3, and format2-4, or the priorities of the DCI formats may be determined in other agreed manners. The priorities of the transmission signals are determined according to the DCI parameter information associated with the transmission signals. In addition, the transmission signals can be divided into groups according to the DCI parameter information associated with the transmission signals, for example, the DCI parameters are divided into groups according to a configured or agreed manner, and the transmission signals with DCI parameters belonging to the same DCI group are put into one transmission signal group. For the transmission signals in the same transmission signal group, the priorities of the transmission signals in the same transmission signal group can be further determined according to at least one of the CORESET index, virtual cell number information, PCI information, RNTI type information, scheduling time interval information, CC index information, etc., and a spatial parameter used for transmitting the transmission signals is determined according to the priorities, wherein the spatial parameter is a spatial parameter corresponding to K transmission signals with high priorities, or a spatial parameter corresponding to $K_i$ transmission signals with high priorities in each transmission signal group, $K_i$ is a positive integer and is the maximum number of spatial parameters of the ith transmission signal group; the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 10

In an exemplary embodiment, at least one first communication node is involved, and each first transmission node may simultaneously transmit multiple transmission signals, such as transmission signal 1, transmission signal 2, transmission signal 3, and transmission signal 4. Herein, the transmission signals mainly refer to various physical channels. The respective transmission signals are transmitted by using different types of channels, where the channel types include, but are not limited to, a PDCCH, a PDSCH, a PUCCH, and a PUSCH. It is assumed herein that the transmission signal 1 to the transmission signal 4 correspond to PDCCH1, PDCCH2, PDSCH 1, and PDSCH 2. The terminal may determine the priorities of the transmission signals according to the received channel type, for example, the priority of the physical control channel is higher than the priority of the physical shared channel, and the priority of the downlink physical channel is higher than the priority of the physical uplink channel. The priorities of the transmission signals can be determined according to the channel types associated with the transmission signals. In addition, the transmission signals may be divided into groups according to the channel types associated with the transmission signals, for example, according to a configured or agreed manner, the transmission signals of which the channel type is a control channel are put into one transmission signal group, and transmission signals of which the channel type is a physical shared channel are put into another transmission signal group. In addition, with regard to the transmission signals in the same transmission signal group, the priorities of the transmission signals can be further determined according to at least one of a CORESET index, virtual cell number information, PCI information, RNTI type information, parameter information of DCI, scheduling time interval information and CC index information corresponding to the transmission signal, and a spatial parameter used for receiving the transmission signals can be determined according to the priorities, wherein the spatial parameter is a spatial parameter corresponding to K transmission signals with high priorities, or a spatial parameter corresponding to $K_i$ transmission signals with high priorities in each transmission signal group, $K_i$ is a positive integer and is the maximum number of spatial parameters of the ith transmission signal group, and the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

Exemplary Embodiment 11

In an exemplary embodiment, at least one first communication node is involved, and the first communication node may simultaneously transmit multiple service types, including a first transmission signal and a second transmission signal, wherein the first transmission signal may also be one of PUSCH1, PUCCH1 and PDSCH1, and the second transmission signal may be one of PUSCH2, PUCCH2 and PDSCH2. Herein, the priorities of the transmission signals are determined according to PI information in the physical downlink control information, that is, a value in a Priority indicator field in a downlink control format 0-1, 0-2, 1-1 or 1-2 (DCI0_1 or DCI0_2, DCI1_1 or DCI1_2), where a larger PI value in the DCI indicates a higher priority of the transmission signal corresponding to the DCI, and the transmission signal can be transmitted preferentially. For example, if the PI value of the DCI corresponding to the first transmission signal is 1, and the PI value of the DCI corresponding to the second transmission signal is 0, then the priority of the second transmission signal is lower than the priority of the first transmission signal; otherwise, the priority of the second transmission signal is higher than the priority of the first transmission signal. The terminal may determine the priorities of the first transmission signal and the second transmission signal according to the received PI indicator, and determine the spatial parameter of the transmission signals according to the priorities. In addition, the transmission signals may be divided into groups according to the PI indicators, for example, the transmission signals corresponding to a PI value of 1 belong to one transmission signal group, and the transmission signals corresponding to a PI value of 0 belong to another group. With regard to the transmission signals in the same transmission signal group, the priorities of the transmission signals in the transmission signal group can be determined according to at least one of a CORESET group index, a CORESET index, virtual cell number information, PCI information, RNTI type information, parameter information of DCI, scheduling time interval information, channel type information, and CC index information, and a spatial parameter used for transmitting the transmission signals can be determined according to the priorities of the transmission signals. In addition, the transmission signals may also be divided into groups based on a CORESET group, and a transmission signal with a CORESET group index being 0 is lower than a transmission signal with a CORESET group index being 1. The priorities of the transmission signals in the same CORESET group can further be determined according to the magnitude of the PI value, for example, the transmission signal with a larger PI value has a higher priority.

The spatial parameter is a spatial parameter corresponding to K transmission signals with high priorities, or a spatial parameter corresponding to $K_i$ transmission signals with high priorities in each transmission signal group, wherein $K_i$ is a positive integer and is the maximum number of spatial parameters of the ith transmission signal group, the sum of $K_i$ of all the transmission signal groups is less than K, i=1, . . . , C, C is the number of transmission signal groups, K is an integer greater than or equal to 1 and less than N, and K and $K_i$ are configured by higher layer signaling or are determined according to a UE capability.

In exemplary embodiments 1 to 10, a base station transmits the transmission signals by using a spatial parameter corresponding to the transmission signals, or transmits the transmission signals according to the determined spatial parameter; and a terminal receives one of the transmission signals according to the determined spatial parameter, where the received transmission signal may be all transmission signals sent by the base station, or may be K transmission signals with higher priorities.

Through the description of the above embodiments, a person having ordinary skill in the art can clearly understand that the method according to the above embodiments may be implemented by software in addition to a necessary universal hardware platform, and definitely may also be implemented by hardware. However, in many cases, the former is an exemplary implementation. Based on such understanding, the essence of the technical solution of the embodiments of the present disclosure or the part contributing to the prior art may be embodied in the form of a software product. The computer software product is stored in a storage medium (such as a ROM/RAM, a magnetic disk, or an optical disk), and includes multiple instructions for instructing a terminal device (which may be a mobile phone, a computer, a server, or a network device) to execute the methods described in the embodiments of the present disclosure.

Embodiment 2

This embodiment provides a spatial parameter determination method. FIG. 3 is a flowchart (2) of a spatial parameter determination method according to an embodiment of the present disclosure. As shown in FIG. 3, the spatial parameter determination method in this embodiment includes operation S202.

At S202, a spatial parameter of a second transmission signal is determined according to one of:

a first transmission signal, one or more preset Transmission Configuration Indicator (TCI) code points, or a Control Resource Set (CORESET);

wherein a time interval between a physical downlink control channel scheduling the second transmission signal and the second transmission signal is less than a first preset threshold.

It should be further noted that, in the above embodiment, the first transmission signal is a transmission signal whose scheduling time is greater than or equal to a time domain interval threshold timeDurationForQCL. The above-mentioned TCI code point is the lowest code point in the TCI code points with the number of corresponding TCI states equal to 2. Generally, each code point includes one or two TCI states. In a case where the code point includes two TCI states, in this embodiment, the spatial parameter of the second transmission signal may be determined according to any one of the two TCI states in the code point. In some exemplary implementations, the spatial parameter of the second transmission signal may be determined according to the first TCI state of the two TCI states.

In an embodiment, in the above operation S202, the spatial parameter of the second transmission signal is determined according to one of the following manners:

in a case where the first transmission signal exists on a time domain symbol where the second transmission signal is located, determining the spatial parameter of the second transmission signal according to a spatial parameter of the first transmission signal or according to a spatial parameter of the one or more TCI code points; or, in a case where the first transmission signal does not exist on the time domain symbol where the second transmission signal is located, determining the spatial parameter of the second transmission signal according to the spatial parameter corresponding to the one or more TCI code points.

In an embodiment, in the operation S202, determining the spatial parameter of the second transmission signal according to the spatial parameter of the first transmission signal or according to the spatial parameter of the one or more TCI code points includes:

in a case where the number of spatial parameters corresponding to the first transmission signal is greater than or equal to a first preset value, determining the spatial parameter of the second transmission signal according to one of the spatial parameters corresponding to the first transmission signal; or, in a case where the number of the spatial parameters corresponding to the first transmission signal is less than the first preset value, determining the spatial parameter of the second transmission signal according to signaling information or in a preset manner, or determining the spatial parameter of the second transmission signal according to the spatial parameter of the one or more TCI code points.

Figure 4:
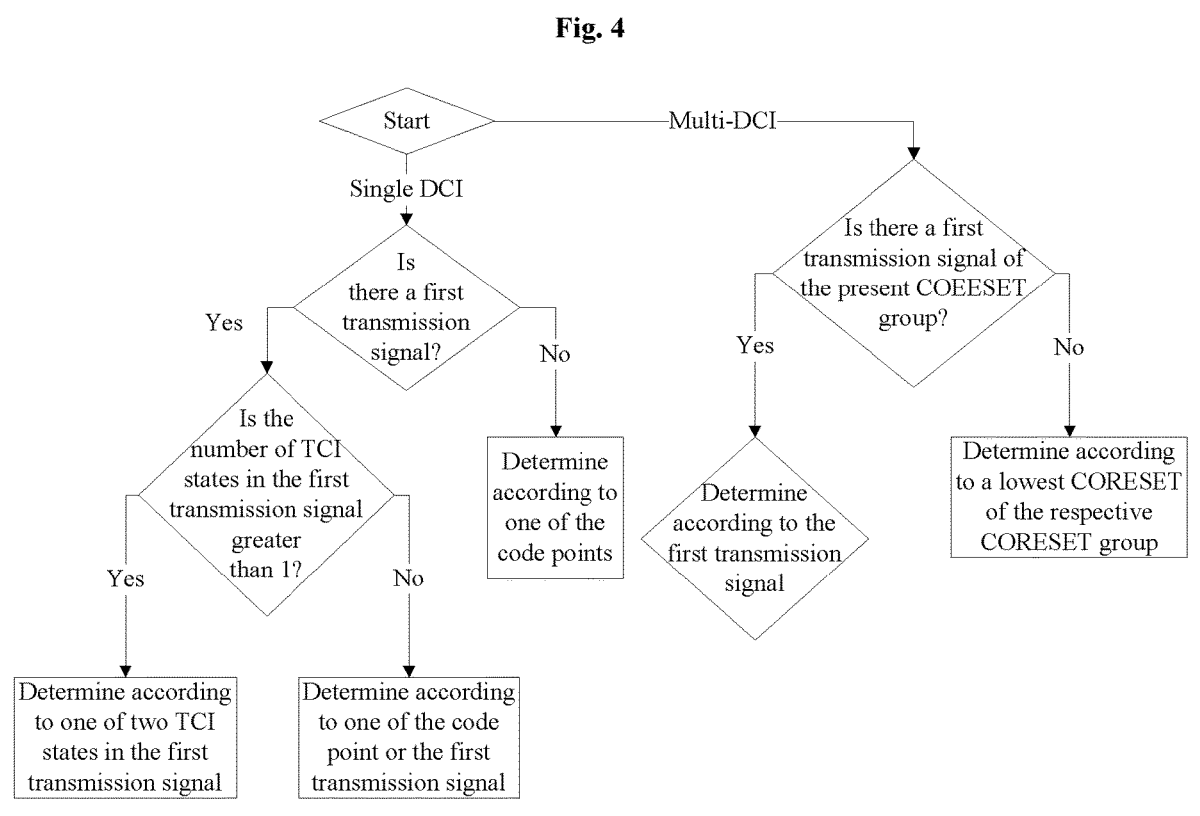

It should be further noted that the above embodiments are applicable to a Single DCI mode and a Multi DCI mode. The Single DCI mode refers to a mode in which one base station sends a control channel but schedules data of two base stations. The Multi DCI mode refers to a mode in which multiple coordinated base stations separately send control information and separately schedule their respective data. FIG. 4 is a flowchart (1) for determining a spatial parameter under a Single DCI mode and a Multi DCI mode according to an embodiment of the present disclosure, and in the above embodiment, a flow of determining the spatial parameter under the Single DCI mode and the Multi DCI mode is as shown in FIG. 4.

In an embodiment, the number of TCI states corresponding to at least one of the one or more TCI code points is greater than or equal to a second preset value.

The TCI code point is defined based on a frequency domain bandwidth of the second transmission signal, that is, each BWP or CC corresponding to the second transmission signal corresponds to an independent TCI code point definition, and the TCI code point is used to indicate the correspondence relation between the TCI indication field in the PDCCH and the TCI state.

In an embodiment, in the above operation S202, the spatial parameter of the second transmission signal is determined according to one of the following manners:

in a case where the first transmission signal exists on a time domain symbol where the second transmission signal is located, determining the spatial parameter of the second transmission signal according to a spatial parameter of the first transmission signal or according to a spatial parameter of a CORESET satisfying a preset feature in the CORESET group; or, in a case where the first transmission signal does not exist on the time domain symbol where the second transmission signal is located, determining the spatial parameter of the second transmission signal according to the spatial parameter of the CORESET satisfying the preset feature in the CORESET group.

In an embodiment, in the above operation S202, determining the spatial parameter of the second transmission signal according to the spatial parameter of the first transmission signal or according to the spatial parameter of the CORESET satisfying the preset feature in the CORESET group includes:

in a case where the number of spatial parameters corresponding to the first transmission signal is greater than or equal to a first preset value, determining the spatial parameter of the second transmission signal according to one of the spatial parameters corresponding to the first transmission signal; or, in a case where the number of the spatial parameters corresponding to the first transmission signal is less than the first preset value, determining the spatial parameter of the second transmission signal according to signaling information or in a preset manner, or determining the spatial parameter of the second transmission signal according to the spatial parameter of the CORESET satisfying the preset feature in the CORESET group.

It should be further noted that, in the above embodiment, the situations concerning whether there are one or more (usually two) TCI states in the first transmission signal under the Single DCI mode or the Multi DCI mode are further distinguished. FIG. 5 is a flowchart (2) for determining a spatial parameter under a Single DCI mode and a Multi DCI mode according to an embodiment of the present disclosure, and in the above embodiment, a flow for determining the spatial parameter under the Single DCI mode and the Multi DCI mode according to an embodiment of the present disclosure is shown in FIG. 5.

In an embodiment, the spatial parameter determination method in this embodiment further includes at least one of the following conditions:

a CORESET in which a downlink control channel for scheduling the second transmission signal is located belongs to one CORESET group;

the number of CORESET groups corresponding to a frequency domain bandwidth in which the second transmission signal is located is greater than a third preset value, wherein the frequency domain bandwidth in which the second transmission signal is located refers to a BWP or a CC for transmitting the second transmission signal, or one BWP in the CC.

the CORESET satisfying the preset feature in the CORE-SET group includes: a CORESET with a lowest CORESET index in CORESETs, which are associated with detection search spaces, in the CORESET group in a time unit which is closest to the second transmission signal and includes a CORESET in the CORESET group.

It should be further noted that, in the above embodiment, the COREST group corresponding to the frequency domain bandwidth includes the CORESET group included in the scheduling frequency domain bandwidth for scheduling the transmission signals in the frequency domain bandwidth.

In an embodiment, the first transmission signal includes a channel and/or a signal, and the second transmission signal includes a channel and/or a signal.

The first transmission signal includes at least one of:

a transmission signal with a scheduling interval greater than or equal to a second preset threshold, wherein the scheduling interval includes a time interval between a physical downlink control channel scheduling the first transmission signal and the first transmission signal; a periodic reference signal; a semi-persistent reference signal; a physical downlink shared channel; a physical uplink shared channel; a physical uplink control channel; a physical downlink control channel; and a CORE-SET.

Alternatively or additionally, the second transmission signal includes at least one of: an aperiodic reference signal, a physical downlink shared channel, and a physical uplink shared channel.

It should be further noted that, in the above embodiment, an aperiodic reference signal, a physical downlink shared channel, and a physical uplink shared channel are merely exemplary signals of the second transmission signals, and on the premise that the first transmission signal includes any signal in the above embodiments, the second transmission signal may also be other signals except the non-periodic reference signal, the physical downlink shared channel, and the physical uplink shared channel.

In an embodiment, the spatial parameter may include at least one of:

a quasi-co-located parameter, a quasi-co-located reference signal, a quasi-co-located reference signal associated with a spatial reception parameter, a spatial transmission filter, and a spatial relation reference signal.

It should be further noted that, in the above embodiment, the quasi-co-located parameter includes at least one of: a spatial reception parameter, an average delay, a delay spread, a Doppler shift, and a Doppler spread.

In an embodiment, the spatial parameter determination method in this embodiment further includes:

determining the spatial parameter of the second transmission signal according to one of:

a first determination result or a second determination result;

wherein the first determination result is used for indicating whether the number of TCI states corresponding to at least one TCI code point of the one or more TCI code points is greater than or equal to a second preset value, wherein the TCI code point corresponds to a frequency domain bandwidth in which the second transmission signal is located, and the TCI code point is a correspondence relation between a TCI indication field in the PDCCH and a TCI state;

the second determination result is used for indicating whether the number of CORESET groups corresponding to a frequency domain bandwidth in which the second transmission signal is located is greater than a third preset value.

It should be further noted that, in the above embodiment, the COREST groups corresponding to the frequency domain bandwidth includes the CORESET groups included in the scheduling frequency domain bandwidth for scheduling the transmission signals in the frequency domain bandwidth.

Through the description of the above embodiments, a person having ordinary skill in the art can clearly understand that the method according to the above embodiments may be implemented by software in addition to a necessary universal hardware platform, and definitely may also be implemented by hardware. However, in many cases, the former is an exemplary implementation. Based on such understanding, the essence of the technical solutions of the embodiments of the present disclosure or the part contributing to the prior art may be embodied in the form of a software product. The computer software product is stored in a storage medium (such as a ROM/RAM, a magnetic disk, or an optical disk), and includes multiple instructions for instructing a terminal device (which may be a mobile phone, a computer, a server, or a network device) to execute the methods described in the embodiments of the present disclosure.

Embodiment 3

Figure 6:
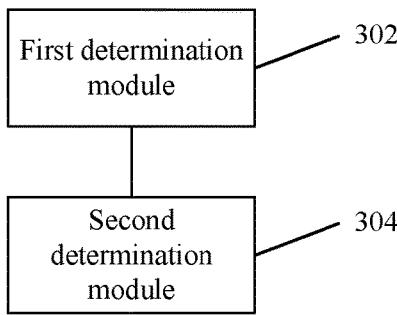
FIG. 6 is a structure diagram (1) of a spatial parameter determination device according to an embodiment of the present disclosure.

The present embodiment provides a spatial parameter determination device. The device is used for implementing the described embodiments and exemplary implementations, and what has been described will not be elaborated. The term "module", as used hereinafter, is a combination of software and/or hardware capable of realizing a preset function. Although the device described in the following embodiment is preferably implemented by software, implementation of hardware or a combination of software and hardware is also possible and conceived. FIG. 6 is a structure diagram (1) of a spatial parameter determination device according to an embodiment of the present disclosure. As shown in FIG. 6, the spatial parameter determination device in this embodiment includes:

a first determination module 302, configured to determine priority information of N types of transmission signals according to first configuration information, wherein N is an integer greater than 1; and a second determination module 304, configured to determine spatial parameter information corresponding to a same symbol according to the priority information, wherein the spatial parameter information is used for transmitting at least one type of transmission signals in the N types of transmission signals.

It should be further noted that, technical effects of other embodiments of the spatial parameter determination device provided in this embodiment all correspond to the spatial parameter determination method in Embodiment 1, and are not described herein again.

In an embodiment, in the N types of transmission signals, the same type of transmission signals are associated with the same spatial parameter information, and different types of transmission signals are associated with different spatial parameter information.

In an embodiment, the process of determining the spatial parameter information corresponding to the same symbol according to the priority information includes:

determining spatial parameter information associated with K types of transmission signals with high priorities in the N types of transmission signals as the spatial parameter information corresponding to the same symbol, wherein K is a positive integer less than or equal to T, T is a maximum value of the number of spatial parameters corresponding to the same symbol, and T is configured by a higher layer or is determined according to a User Equipment (UE) capability.

In an embodiment, the process of determining the spatial parameter information corresponding to the same symbol according to the priority information includes:

dividing the N types of transmission signals into C transmission signal groups according to second configuration information, wherein each transmission signal group includes one or more types of transmission signals, and one or more types of transmission signals in each transmission signal group are associated with the same second configuration information, and C is a positive integer smaller than or equal to N.

In an embodiment, the second configuration information may include at least one of:

Control Resource Set (CORESET) group information; CORESET index information; priority information of Acknowledgement (ACK) information corresponding to a transmission signal; Priority Indicator (PI) information in physical downlink control information; virtual cell number information; Physical Cell Identity (PCI) information; Radio Network Temporary Identifier (RNTI) type information; parameter information of Downlink Control Information (DCI); scheduling time interval information; channel type information; and Carrier Component (CC) index information.

In an embodiment, the process of determining the spatial parameter information corresponding to the same symbol according to the priority information includes:

for an ith transmission signal group in the C transmission signal groups, determining spatial parameter information associated with $K_i$ types of transmission signals with high priorities in the ith transmission signal group as the spatial parameter information, used for the one or more types of transmission signals in the ith transmission signal group, corresponding to the same symbol, wherein i is a positive integer less than or equal to C;

wherein $K_i$ is a positive integer less than or equal to $T_i$; $T_i$ is a maximum value of the number of spatial parameters corresponding to the ith transmission signal group in the same symbol, and $T_i$ is configured by a higher layer or is determined according to a User Equipment (UE) capability.

In an embodiment, a set formed by the $K_i$ types of transmission signals corresponding to respective transmission signal groups of the C transmission signal groups includes K types of transmission signals, and a sum of multiple $K_i$ is equal to K;

wherein K is a positive integer less than or equal to T; the K types of transmission signals are one or more types of transmission signals with high priorities in the N types of transmission signals; and T is a maximum value of the number of spatial parameters corresponding to the same symbol, and T is configured by a higher layer or is determined according to a User Equipment (UE) capability.

In an embodiment, the first determination module is further configured to:

determine M types of transmission signals with high priorities from the C transmission signal groups, wherein M is a positive integer greater than T; and determine, according to the priority information of the transmission signals, the spatial parameter information associated with T types of transmission signals with high priorities in the M types of transmission signals as the spatial parameter information corresponding to the same symbol.

In an embodiment, the first configuration information may include at least one of:

Control Resource Set (CORESET) group information; CORESET index information; priority information of Acknowledgement (ACK) information corresponding to a transmission signal; Priority Indicator (PI) information in physical downlink control information; virtual cell number information; Physical Cell Identity (PCI) information; Radio Network Temporary Identifier (RNTI) type information; parameter information of Downlink Control Information (DCI); scheduling time interval information; channel type information; and Carrier Component (CC) index information.

In an embodiment, the process of determining the priority information of the N types of transmission signals according to the first configuration information includes:

in a case where the first configuration information is the CORESET group information, determining the priority information of each transmission signal based on a criteria that the smaller a CORESET group index of the CORESET group information corresponding to the transmission signal is, the higher a priority indicated by the priority information of the transmission signal is; or, in a case where the first configuration information is the CORESET index information, determining the priority information of each transmission signal based on a criteria that the smaller a CORESET index corresponding to the transmission signal is, the higher a priority indicated by the priority information of the transmission signal is; or, in a case where the first configuration information is the priority information of the ACK information corresponding to the transmission signal, determining the priority information of each transmission signal based on a criteria that the higher the priority information of the ACK information corresponding to the transmission signal is, the higher a priority indicated by the priority information of the transmission signal is, wherein the priority information of the ACK information corresponding to the transmission signal is determined by higher layer signaling or is determined in a preset manner; or, in a case where the first configuration information is the PI information in the physical downlink control information, determining the priority information of each transmission signal based on a criteria that the higher the PI information in the physical downlink control information corresponding to the transmission signal is, the higher a priority indicated by the priority information of the transmission signal is, wherein the PI information in the physical downlink control information is determined by higher layer signaling or is determined in a preset manner; or, in a case where the first configuration information is the virtual cell number, determining the priority information of each transmission signal based on a criteria that the smaller the virtual cell number corresponding to the transmission signal is, the higher a priority indicated by the priority information of the transmission signal is; or, in a case where the first configuration information is the PCI information, determining the priority information of each transmission signal based on a criteria that the smaller the PCI information corresponding to the transmission signal is, the higher a priority indicated by the priority information of the transmission signal is; or, in a case where the first configuration information is the RNTI type information, determining the priority information of each transmission signal based on a criteria that the higher the priority information of a RNTI type corresponding to the transmission signal is, the higher a priority indicated by the priority information of the transmission signal is, wherein the priority information of the RNTI type is determined by higher layer signaling or is determined in a preset manner; or, in a case where the first configuration information is the parameter information of the DCI, determining the priority information of each transmission signal based on a criteria that the higher the priority information of the parameter information of the DCI corresponding to the transmission signal is, the higher a priority indicated by the priority information of the transmission signal is, wherein the priority information of the parameter information of the DCI is determined by higher layer signaling or is determined in a preset manner; or, in a case where the first configuration information is the channel type information, determining the priority information of each transmission signal based on a criteria that the higher the priority information of the channel type information corresponding to the transmission signal is, the higher a priority indicated by the priority information of the transmission signal is, wherein the priority information of the channel type information is determined by higher layer signaling or is determined in a preset manner; or, in a case where the first configuration information is the scheduling time interval information, determining the priority information of each transmission signal based on a criteria that the greater a scheduling time interval corresponding to the transmission signal is, the higher a priority indicated by the priority information of the transmission signal is; or, in a case where the first configuration information is the CC index information, determining the priority information of each transmission signal based on a criteria that the smaller a CC index corresponding to the transmission signal is, the higher a priority indicated by the priority information of the transmission signal is.

In an embodiment, the first determination module is further configured to:

in a case where the transmission signal has no associated Control Resource Set (CORESET) group or CORESET, determine an associated CORESET group or CORESET for the transmission signal.

In an embodiment, the spatial parameter information includes at least one of:

a quasi-co-located parameter; a quasi co-located reference signal; a quasi co-located reference signal associated with a spatial reception parameter; a spatial transmission filter; and a spatial relation reference signal.

It should be noted that each module may be implemented by software or hardware. The latter may be implemented in the following manner, but is not limited thereto. All the modules are located in a same processor; alternatively, the modules are located in different processors in an arbitrary combination.

Embodiment 4

Figure 7:
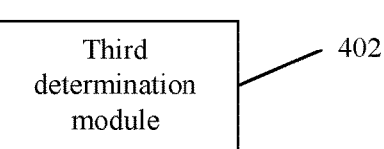
FIG. 7 is a structure diagram (2) of a spatial parameter determination device according to an embodiment of the present disclosure.

The present embodiment provides a spatial parameter determination device. The device is used for implementing the described embodiments and exemplary implementations, and what has been described will not be elaborated. The term "module", as used hereinafter, is a combination of software and/or hardware capable of realizing a preset function. Although the device described in the following embodiment is preferably implemented by software, implementation of hardware or a combination of software and hardware is also possible and conceived. FIG. 7 is a structure diagram (2) of a spatial parameter determination device according to an embodiment of the present disclosure. As shown in FIG. 7, the spatial parameter determination device in this embodiment includes:

a third determination module, configured to determine a spatial parameter of a second transmission signal according to one of:

a first transmission signal, one or more preset Transmission Configuration Indicator (TCI) code points, or a Control Resource Set (CORESET);

wherein a time interval between a physical downlink control channel scheduling the second transmission signal and the second transmission signal is less than a first preset threshold.

It should be further noted that, other embodiments and technical effects of the spatial parameter determination device provided in this embodiment all correspond to the spatial parameter determination method described in Embodiment 2, and are not described herein again.

In an embodiment, the process of determining the spatial parameter of the second transmission signal includes:

in a case where the first transmission signal exists on a time domain symbol where the second transmission signal is located, determining the spatial parameter of the second transmission signal according to a spatial parameter of the first transmission signal or according to a spatial parameter of the one or more TCI code points; or, in a case where the first transmission signal does not exist on the time domain symbol where the second transmission signal is located, determining the spatial parameter of the second transmission signal according to the spatial parameter corresponding to the one or more TCI code points.

In an embodiment, the process of determining the spatial parameter of the second transmission signal according to the spatial parameter of the first transmission signal or according to the spatial parameter of the one or more TCI code points includes:

in a case where the number of spatial parameters corresponding to the first transmission signal is greater than or equal to a first preset value, determining the spatial parameter of the second transmission signal according to one of the spatial parameters corresponding to the first transmission signal; or, in a case where the number of the spatial parameters corresponding to the first transmission signal is less than the first preset value, determining the spatial parameter of the second transmission signal according to signaling information or in a preset manner, or determining the spatial parameter of the second transmission signal according to the spatial parameter of the one or more TCI code points.

In an embodiment, in the above TCI code points, the number of TCI states corresponding to at least one of the one or more TCI code points is greater than or equal to a second preset value.

The TCI code point is defined based on a frequency domain bandwidth of the second transmission signal, that is, each BWP or CC corresponding to the second transmission signal corresponds to an independent TCI code point definition, and the TCI code point is used to indicate the correspondence relation between the TCI indication field in the PDCCH and the TCI state.

In an embodiment, the process of determining the spatial parameter of the second transmission signal includes:

in a case where the first transmission signal exists on a time domain symbol where the second transmission signal is located, determining the spatial parameter of the second transmission signal according to a spatial parameter of the first transmission signal or according to a spatial parameter of a CORESET satisfying a preset feature in the CORESET group; or, in a case where the first transmission signal does not exist on the time domain symbol where the second transmission signal is located, determining the spatial parameter of the second transmission signal according to the spatial parameter of the CORESET satisfying the preset feature in the CORESET group.

In an embodiment, the process of determining the spatial parameter of the second transmission signal according to the spatial parameter of the first transmission signal or according to the spatial parameter of the CORESET satisfying the preset feature in the CORESET group includes:

in a case where the number of spatial parameters corresponding to the first transmission signal is greater than or equal to a first preset value, determining the spatial parameter of the second transmission signal according to one of the spatial parameters corresponding to the first transmission signal; or, in a case where the number of the spatial parameters corresponding to the first transmission signal is less than the first preset value, determining the spatial parameter of the second transmission signal according to signaling information or in a preset manner, or determining the spatial parameter of the second transmission signal according to the spatial parameter of the CORESET satisfying the preset feature in the CORESET group.

In an embodiment, the third determination module further includes at least one of the following conditions:

a CORESET in which a downlink control channel for scheduling the second transmission signal is located belongs to one CORESET group;

the number of CORESET groups corresponding to a frequency domain bandwidth in which the second transmission signal is located is greater than a third preset value, wherein the frequency domain bandwidth in which the second transmission signal is located refers to a BWP or a CC for transmitting the second transmission signal, or one BWP in a CC; and the CORESET satisfying the preset feature in the CORESET group includes: a CORESET with a lowest CORESET index in CORESETs, which are associated with detection search spaces, in the CORESET group in a time unit which is closest to the second transmission signal and includes a CORESET in the CORESET group.

In an embodiment, the first transmission signal includes a channel and/or a signal, and the second transmission signal includes a channel and/or a signal.

The first transmission signal includes at least one of:

a transmission signal with a scheduling interval greater than or equal to a second preset threshold, wherein the scheduling interval includes a time interval between a physical downlink control channel scheduling the first transmission signal and the first transmission signal; a periodic reference signal; a semi-persistent reference signal; a physical downlink shared channel; a physical uplink shared channel; a physical uplink control channel; a physical downlink control channel; and a CORESET.

Alternatively or additionally, the second transmission signal includes at least one of: an aperiodic reference signal, a physical downlink shared channel, and a physical uplink shared channel.

In an embodiment, the spatial parameter may include at least one of:

a quasi-co-located parameter, a quasi-co-located reference signal, a quasi-co-located reference signal associated with a spatial reception parameter, a spatial transmission filter, and a spatial relation reference signal.

In an embodiment, the third determination module is further configured to:

determine the spatial parameter of the second transmission signal according to one of:

a first determination result or a second determination result;

wherein the first determination result is used for indicating whether the number of TCI states corresponding to at least one TCI code point of the one or more TCI code points is greater than or equal to a second preset value; and the second determination result is used for indicating whether the number of CORESET groups corresponding to a frequency domain bandwidth in which the second transmission signal is located is greater than a third preset value.

It should be noted that each module may be implemented by software or hardware. The latter may be implemented in the following manner, but is not limited thereto. All the modules are located in a same processor; alternatively, the modules are located in different processors in an arbitrary combination.

Embodiment 5

An embodiment of the present disclosure further provides a computer-readable storage medium. The computer-readable storage medium stores a computer program, wherein the computer program is configured to execute the operations in any one of the method embodiments during running.

In an embodiment, the described computer-readable storage medium may be configured to store a computer program for executing the described embodiments.

In an embodiment, the computer-readable storage medium may include, but is not limited to, any medium that can store a computer program, such as a USB flash disk, a Read-Only Memory (ROM), a Random Access Memory (RAM), a mobile hard disk, a magnetic disk, or an optical disk.

Embodiment 6

An embodiment of the present disclosure also provides an electronic device, including a memory and a processor, wherein the memory stores a computer program, and the processor is configured to run the computer program so as to execute the operations in any of the described method embodiments.

In an embodiment, the electronic device may further include a transmission device and an input/output device, wherein the transmission device is connected to the processor, and the input/output device is connected to the processor.

In an embodiment, the above processor may be configured to perform the operations in the above embodiments by running a computer program.

In an embodiment, for specific examples in this embodiment, reference may be made to the examples described in the above embodiments and exemplary embodiments, and details are not repeatedly described herein in this embodiment.

Obviously, those having ordinary skill in the art should understand that each module or each operation of the described embodiments of the present disclosure can be implemented by a universal computing device, and can be concentrated on a single computing device or distributed on a network composed of multiple computing devices. In an embodiment, the modules or operations can be implemented by program codes executable for the computing devices, so that the modules or operations can be stored in a storage device for execution with the computing devices. The shown or described operations can be executed in sequences different from those described here in some cases, or the modules or operations can be made into integrated circuit modules respectively, or multiple modules or operations therein can be made into a single integrated circuit module for implementation. Thus, the present disclosure is not limited to any specific combination of hardware and software.

The above description is only the exemplary embodiments of the present disclosure, and is not intended to limit the present disclosure. For those having ordinary skill in the art, the embodiments of the present disclosure may have various modifications and variations. Any modifications, equivalent replacements, improvements and the like made within the principle of the present disclosure shall belong to the protection scope of the present disclosure.

What is claimed is:

1. A spatial parameter determination method, comprising:
   determining priority information of N types of transmission signals according to first configuration information, wherein N is an integer greater than 1, the first configuration information comprises at least one of: Control Resource Set (CORESET) group information; CORESET index information; priority information of Acknowledgement (ACK) information corresponding to a transmission signal; Priority Indicator (PI) information in physical downlink control information; virtual cell number information; Physical Cell Identity (PCI) information; parameter information of Downlink Control Information (DCI); scheduling time interval information; channel type information; and Carrier Component (CC) index information; and
   determining spatial parameter information corresponding to a same symbol according to the priority information, wherein the spatial parameter information is used for transmitting at least one type of transmission signals in the N types of transmission signals;
   wherein determining the spatial parameter information corresponding to the same symbol according to the priority information comprises: determining spatial parameter information associated with K types of transmission signals with high priorities in the N types of transmission signals as the spatial parameter information corresponding to the same symbol, wherein K is a positive integer less than or equal to T, T is a maximum value of a number of spatial parameters corresponding to the same symbol, and T is configured by a higher layer or is determined according to a User Equipment (UE) capability.

2. The method according to claim 1, wherein in the N types of transmission signals same type of transmission signals are associated with same spatial parameter information, and different types of transmission signals are associated with different spatial parameter information.

3. The method according to claim 1, wherein determining the spatial parameter information corresponding to the same symbol according to the priority information comprises:
   dividing the N types of transmission signals into C transmission signal groups according to second configuration information, wherein one or more types of transmission signals in each transmission signal group are associated with the same second configuration information, and C is a positive integer smaller than or equal to N.

4. The method according to claim 3, wherein the second configuration information comprises at least one of:
   Control Resource Set (CORESET) group information; CORESET index information; priority information of Acknowledgement (ACK) information corresponding to a transmission signal; Priority Indicator (PI) information in physical downlink control information; virtual cell number information; Physical Cell Identity (PCI) information; Radio Network Temporary Identifier (RNTI) type information; parameter information of Downlink Control Information (DCI); scheduling time interval information; channel type information; and Carrier Component (CC) index information.

5. The method according to claim 3, wherein determining the spatial parameter information corresponding to the same symbol according to the priority information comprises:
   for an ith transmission signal group in the C transmission signal groups, determining spatial parameter information associated with $K_i$ types of transmission signals with high priorities in the ith transmission signal group as the spatial parameter information corresponding to the same symbol, used for the one or more types of transmission signals in the ith transmission signal group, corresponding to the same symbol, wherein i is a positive integer less than or equal to C;
   wherein $K_i$ is a positive integer less than or equal to Ti; Ti is a maximum value of a number of spatial parameters corresponding to the ith transmission signal group in the same symbol, and $T_i$ is configured by the higher layer or is determined according to the User Equipment (UE) capability.

6. The method according to claim 5, wherein a set formed by the $K_i$ types of transmission signals corresponding to respective transmission signal groups of the C transmission signal groups comprises K types of transmission signals, and a sum of multiple $K_i$ is equal to K;

wherein K is a positive integer less than or equal to T; the K types of transmission signals are one or more types of transmission signals with high priorities in the N types of transmission signals; and T is a maximum value of the number of spatial parameters corresponding to the same symbol, and T is configured by the higher layer or is determined according to the User Equipment (UE) capability.

7. The method according to claim 6, further comprising:
determining M types of transmission signals with high priorities from the C transmission signal groups, wherein M is a positive integer greater than T; and
determining, according to the priority information of the M types of transmission signals, spatial parameter information associated with T types of transmission signals with high priorities in the M types of transmission signals as the spatial parameter information corresponding to the same symbol.

8. The method according to claim 1, wherein the first configuration information further comprises:
Radio Network Temporary Identifier (RNTI) type information;
and/or,
the spatial parameter information corresponding to the same symbol comprises at least one of:
a quasi-co-located parameter; a quasi co-located reference signal; a quasi co-located reference signal associated with a spatial reception parameter; a spatial transmission filter;
and a spatial relation reference signal.

9. The method according to claim 8, wherein determining the priority information of the N types of transmission signals according to the first configuration information comprises:
in a case where the first configuration information is the CORESET group information, determining priority information of each transmission signal based on a criteria that the smaller a CORESET group index of the CORESET group information corresponding to the transmission signal is, the higher a priority indicated by the priority information of the transmission signal is; or,
in a case where the first configuration information is the CORESET index information, determining the priority information of each transmission signal based on a criteria that the smaller a CORESET index corresponding to the transmission signal is, the higher the priority indicated by the priority information of the transmission signal is; or,
in a case where the first configuration information is the priority information of the ACK information corresponding to the transmission signal, determining the priority information of each transmission signal based on a criteria that the higher the priority information of the ACK information corresponding to the transmission signal is, the higher the priority indicated by the priority information of the transmission signal is, wherein the priority information of the ACK information corresponding to the transmission signal is determined by higher layer signaling or is determined in a preset manner; or, in a case where the first configuration information is the PI information in the physical downlink control information, determining the priority information of each transmission signal based on a criteria that the higher the PI information in the physical downlink control information corresponding to the transmission signal is, the higher the priority indicated by the priority information of the transmission signal is, wherein the PI information in the physical downlink control information is determined by the higher layer signaling or is determined in the preset manner; or,
in a case where the first configuration information is the virtual cell number information, determining the priority information of each transmission signal based on a criteria that the smaller the virtual cell number information corresponding to the transmission signal is, the higher the priority indicated by the priority information of the transmission signal is; or,
in a case where the first configuration information is the PCI information, determining the priority information of each transmission signal based on a criteria that the smaller the PCI information corresponding to the transmission signal is, the higher the priority indicated by the priority information of the transmission signal is; or,
in a case where the first configuration information is the RNTI type information, determining the priority information of each transmission signal based on a criteria that the higher priority information of a RNTI type corresponding to the transmission signal is, the higher the priority indicated by the priority information of the transmission signal is, wherein the priority information of the RNTI type is determined by the higher layer signaling or is determined in the preset manner; or,
in a case where the first configuration information is the parameter information of the DCI, determining the priority information of each transmission signal based on a criteria that the higher the priority information of the parameter information of the DCI corresponding to the transmission signal is, the higher the priority indicated by the priority information of the transmission signal is, wherein priority information of the parameter information of the DCI is determined by the higher layer signaling or is determined in the preset manner; or,
in a case where the first configuration information is the channel type information, determining the priority information of each transmission signal based on a criteria that the higher priority information of the channel type information corresponding to the transmission signal is, the higher the priority indicated by the priority information of the transmission signal is, wherein the priority information of the channel type information is determined by the higher layer signaling or is determined in the preset manner; or,
in a case where the first configuration information is the scheduling time interval information, determining the priority information of each transmission signal based on a criteria that the greater a scheduling time interval corresponding to the transmission signal is, the higher the priority indicated by the priority information of the transmission signal is; or,
in a case where the first configuration information is the CC index information, determining the priority information of each transmission signal based on a criteria that the smaller a CC index corresponding to the transmission signal is, the higher the priority indicated by the priority information of the transmission signal is.

10. The method according to claim 1, further comprising:

in a case where the transmission signal has no associated Control Resource Set (CORESET) group or CORE-SET, determining an associated CORESET group or CORESET for the transmission signal.

11. An electronic device, comprising a memory and a processor, wherein the memory stores a computer program, and the processor is configured to run the computer program so as to execute the method according to claim 1.

\* \* \* \* \*